(12) United States Patent
Ishiba

(10) Patent No.: US 7,188,803 B2
(45) Date of Patent: Mar. 13, 2007

(54) VERTICAL TAKE-OFF AND LANDING AIRCRAFT

(75) Inventor: Masatsugu Ishiba, Gotenba (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 47 days.

(21) Appl. No.: 10/965,914

(22) Filed: Oct. 18, 2004

(65) Prior Publication Data

US 2005/0230524 A1 Oct. 20, 2005

(30) Foreign Application Priority Data

Oct. 24, 2003 (JP) ............................. 2003-365112

(51) Int. Cl.
*B64C 29/00* (2006.01)
(52) U.S. Cl. ..................... 244/23 R; 244/55
(58) Field of Classification Search .................. 244/2, 244/12.2, 12.3, 12.1, 12.4, 23 R, 23 A, 17.15, 244/17.17, 17.19, 103 R, 103 S, 50
See application file for complete search history.

(56) References Cited

U.S. PATENT DOCUMENTS

| | | | | | |
|---|---|---|---|---|---|
| 1,021,338 | A | * | 3/1912 | Rush ........................... | 244/50 |
| 1,921,043 | A | * | 8/1933 | Roth ........................ | 244/23 R |
| 2,909,342 | A | * | 10/1959 | Maltby .................... | 244/103 R |
| 3,184,183 | A | * | 5/1965 | Plasecki ..................... | 244/23 R |
| 3,276,528 | A | * | 10/1966 | Tucknott et al. ............ | 180/119 |
| 3,309,041 | A | * | 3/1967 | Etchberger ................ | 244/23 R |
| 3,377,037 | A | * | 4/1968 | Stewart ..................... | 244/17.15 |
| 3,494,575 | A | * | 2/1970 | Budworth ....................... | 244/2 |
| 5,419,514 | A | * | 5/1995 | Ducan ........................ | 244/12.4 |
| 6,745,977 | B1 | * | 6/2004 | Long et al. ..................... | 244/2 |
| 6,892,980 | B2 | * | 5/2005 | Kawai ........................ | 244/12.4 |

FOREIGN PATENT DOCUMENTS

DE 102 08 555 9/2003

(Continued)

OTHER PUBLICATIONS

U.S. Appl. No. 10/810,836, filed Mar. 29, 2004.

*Primary Examiner*—Galen Barefoot
(74) *Attorney, Agent, or Firm*—Finnegan, Henderson, Farabow, Garrett, Dunner, LLP

(57) ABSTRACT

A vertical take-off and landing aircraft is provided with a plurality of thrust generators which generate thrust substantially vertically upward with respect to the aircraft; a first prime mover which drives the thrust generators; and an occupant seat. At least one of the thrust generators is disposed at either a front section of the aircraft or a rear section of the aircraft, and the remaining thrust generator or thrust generators are disposed at either the rear section or the front section, whichever the at least one of the thrust generators is not disposed at. The prime mover and a sitting surface of the occupant seat are disposed between the at least one of the thrust generators at the front section of the aircraft and the at least one of the thrust generators at the rear section of the aircraft, and in a position lower than all of the thrust generators. The center of gravity of the vertical take-off and landing aircraft is below the center of the aircraft and hangs down when the aircraft is in flight due to the thrust generated by the thrust generators.

16 Claims, 33 Drawing Sheets

FOREIGN PATENT DOCUMENTS

| | | |
|---|---|---|
| JP | 50-19198 | 2/1975 |
| JP | 51-61700 | 5/1976 |
| JP | 01-285414 | 11/1989 |
| JP | 3-70700 | 3/1991 |
| JP | 07-025389 | 1/1995 |
| JP | 2000-205115 | 7/2000 |
| JP | 2002-370696 | 12/2002 |
| JP | 2003-529495 | 10/2003 |

* cited by examiner

WIND

RESTORATION FORCE

F I G . 33
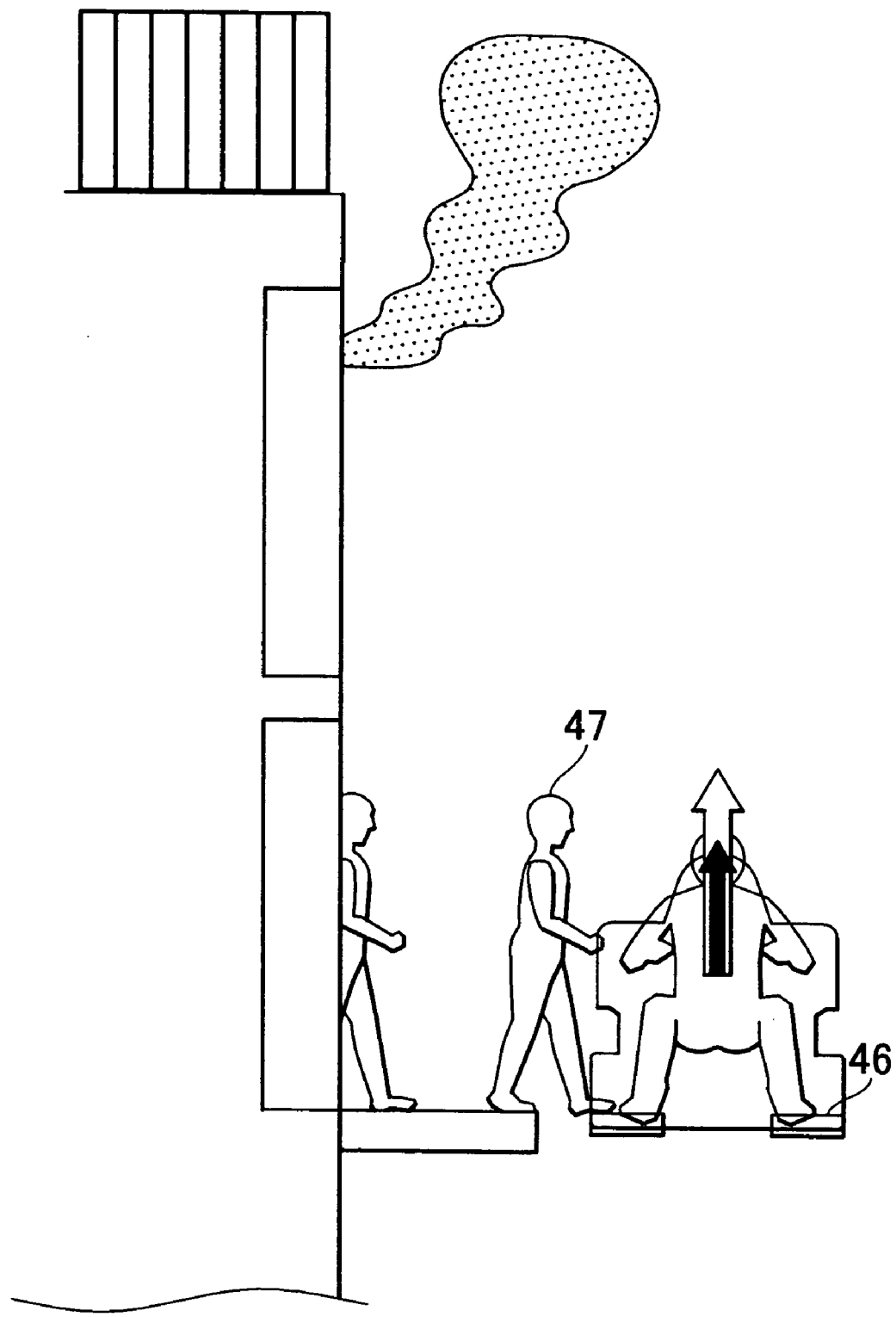

VERTICAL TAKE-OFF AND LANDING AIRCRAFT

INCORPORATION BY REFERENCE

The disclosure of Japanese Patent Application No. 2003-365112 filed on Oct. 24, 2003 including the specification, drawings and abstract is incorporated herein by reference in its entirety.

BACKGROUND OF THE INVENTION

1. Field of the Invention

The invention relates to a small vertical take-off and landing aircraft capable of being used in rescue operations and the like.

2. Description of the Related Art

One known representative example of a vertical take-off and landing aircraft is a helicopter. Another such vertical take-off and landing aircraft disclosed in JP(A) 2002-370696 is provided with a plurality of propeller units for generating lift. These aircraft, however, lack maneuverability due to their large size. In addition, the propeller (i.e., the rotor) extends beyond the periphery of the body of the aircraft which makes it difficult for rescue workers to get close to the site of an accident or fire or the like, thus impairing their ability to rescue persons in need of rescue or to fight fires. Thus, a smaller vertical take-off and landing aircraft possessing excellent maneuverability is desired for use in rescue operations.

Examples of some known small vertical take-off and landing aircraft include the Rocket Belt by Bell Aerospace Co., the Millennium Jet by Trek Entertainment, Inc., and the X-Jet by Williams International. With all of these aircraft, however, the amount and direction of thrust are controlled by mere feeling of the operator and the shifting of the operator's weight, which requires a very skilled pilot.

SUMMARY OF THE INVENTION

In view of the foregoing problems, this invention thus provides a small vertical take-off and landing aircraft that is both easy and safe to fly.

One aspect of the invention relates to a vertical take-off and landing aircraft, provided with a plurality of thrust generators which generate thrust substantially vertically upward with respect to the aircraft; a first prime mover which drives the thrust generators, and an occupant seat. At least one of the thrust generators is disposed at either a front section of the aircraft or a rear section of the aircraft, and the remaining thrust generator or thrust generators are disposed at either the rear section or the front section, whichever the at least one of the thrust generators is not disposed at. The prime mover and a sitting surface of the occupant seat are disposed between the at least one of the thrust generators at the front section of the aircraft and the at least one of the thrust generators at the rear section of the aircraft, and in a position lower than all of the thrust generators.

In a vertical take-off and landing aircraft having this kind of layout, the center of gravity lies low between the thrust generators at the front and rear of the aircraft, such that during flight it tends to hang down due to the thrust generated by the fore and aft thrust generators. As a result, the stability of the aircraft in flight is increased, which improves safety.

Further, arranging the thrust generators at the fore and aft of the aircraft enables the width of the aircraft to be reduced, while providing the occupant seat so that an occupant is seated in a sitting posture enables the height of the aircraft to be reduced. As a result, the aerodynamic moments which act on the aircraft due to air resistance and crosswinds and the like during flight are able to be suppressed, thereby improving both flight stability and fuel efficiency.

Moreover, the aircraft is able to get close to objects such as buildings from the side because no thrust generators are located on the sides of the aircraft.

BRIEF DESCRIPTION OF THE DRAWINGS

The above-mentioned objects, features, advantages, technical and industrial significance of this invention will be better understood by reading the following detailed description of exemplary embodiments of the invention, when considered in connection with the accompanying drawings, in which:

FIG. 33 is a view showing a person in need of being rescued from a burning building.

DETAILED DESCRIPTION OF THE PREFERRED EMBODIMENTS

In the following description and the accompanying drawings, the present invention will be described in more detail with reference to exemplary embodiments.

Figure 1A:
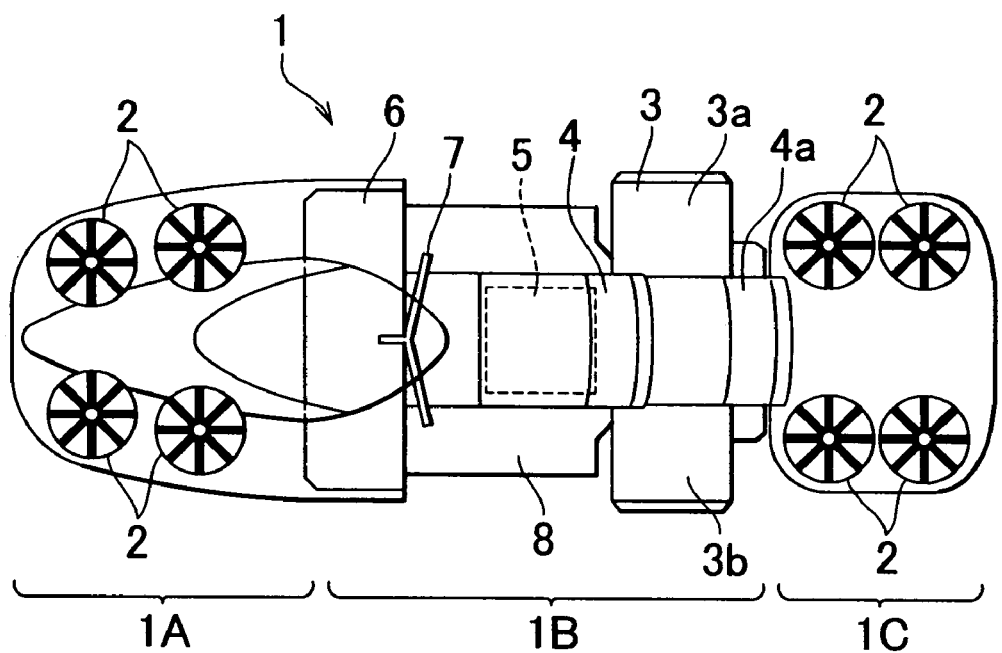
FIG. 1A is a top view of a vertical take-off and landing aircraft according to a first exemplary embodiment of the invention.
Figure 1B:
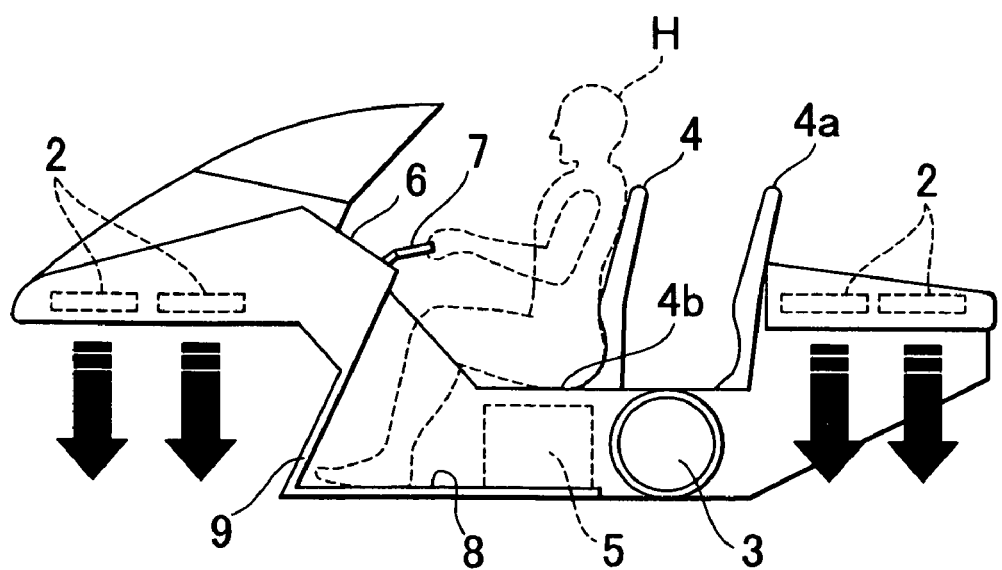
FIG. 1B is a side view of the vertical take-off and landing aircraft according to the first exemplary embodiment.

An outline of a vertical take-off and landing aircraft (hereinafter simply referred to as "aircraft") according to a first exemplary embodiment of the invention is shown in FIGS. 1A and 1B, FIG. 1A being a top view and FIG. 1B being a side view. In this specification, directions such as front (fore), rear (aft), left, right, up, and down are to be understood as being with respect to the operator of the aircraft unless otherwise specified.

An aircraft 1 is made up of three sections, which are, in order from the front of the aircraft, an aircraft front section 1A, an aircraft mid section 1B, and an aircraft rear section 1C. Overall, the aircraft 1 is narrow in the width direction and long in the fore-aft direction.

Four fans 2, which function as thrust generators, are provided at the aircraft front section 1A and four fans 2, which also function as thrust generators, are provided at the aircraft rear section 1C. The fans 2 are arranged symmetrically with respect to the center axis of the aircraft.

An occupant seat 4 for an operator H who operates the aircraft 1 to sit in is provided in substantially the center of the aircraft mid section 1B. A sitting surface 4b of the occupant seat 4, i.e., the portion that bears most of the load of the operator H, is positioned lower than the plane on which the thrust is generated by the fans 2 (i.e., the plane on which the fans 2 rotate). A control panel 6 and a yoke 7 used in steering the aircraft 1 are arranged in front of the occupant seat 4 and an occupant seat 4a for carrying a passenger is located behind the occupant seat 4. The sides of the occupant seats 4 and 4a, that is, the areas to the left and right of the aircraft mid section 1B are open, allowing for people (i.e., the operator H and passenger) to be able to board the aircraft 1 from the side.

A step 8 that extends out to the side is provided at the bottom of the aircraft mid section 1B on both sides. These steps 8 serve as footholds when boarding or deplaning the aircraft 1, as a place to put ones feet while riding the aircraft 1, or as a place to carry cargo. At the front edge of these steps 8 is a leg cover 9 which separates the aircraft front section 1A from the aircraft mid section 1B.

Further in the aircraft mid section 1B, a prime mover 3 for driving the fans 2, as well as a fuel tank 5 in which fuel for the prime mover 3 is stored, are arranged below the sitting surfaces 4b of the occupant seats 4 and 4a. As a failsafe, this exemplary embodiment has two prime movers 3 (3a and 3b) of the same construction mounted facing one another on the aircraft 1. The prime movers 3a and 3b are arranged behind, and extend farther to the outside than, the steps 8. The prime movers 3 also serve to separate the aircraft mid section 1B from the aircraft rear section 1C. It should be noted that the two prime movers 3a and 3b do not need to be arranged facing one another; they may also be parallel to one another.

Figure 2A:
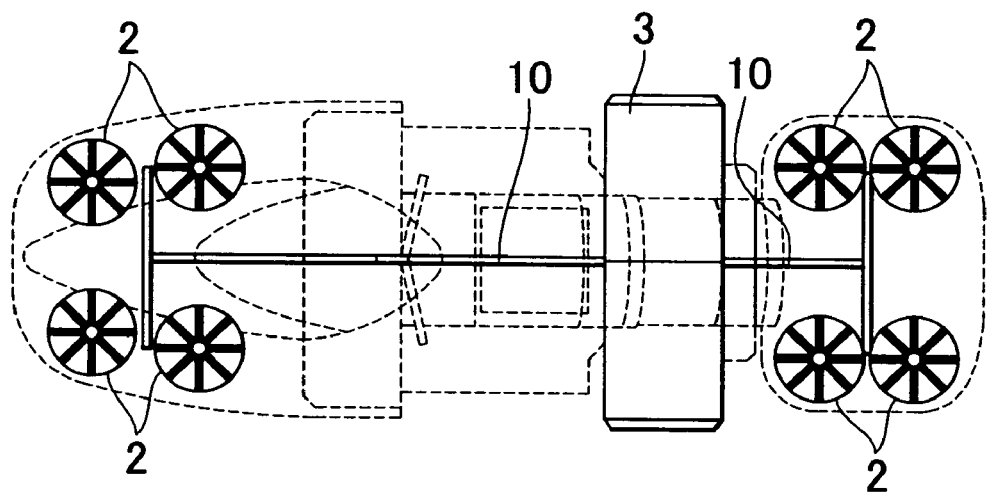
FIGS. 2A and 2B are views showing a high-pressure gas type drive transmission system.
Figure 2B:
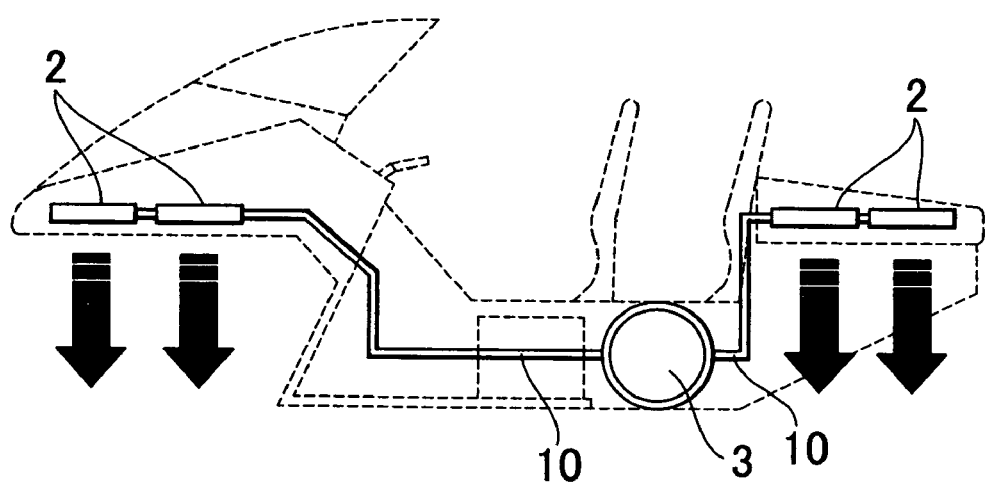
Figure 3A:
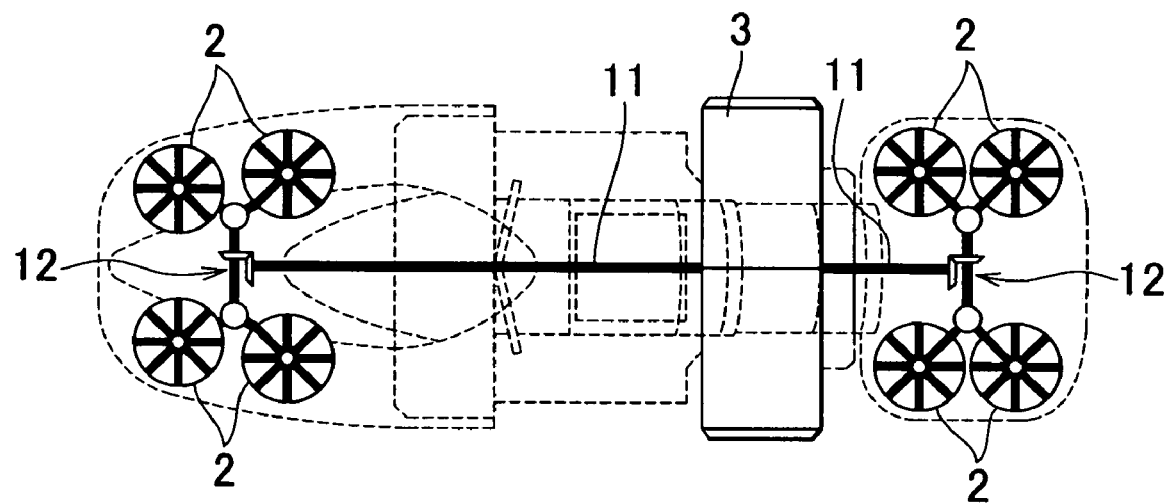
FIGS. 3A and 3B are views showing a motor shaft output type drive transmission system.
Figure 3B:
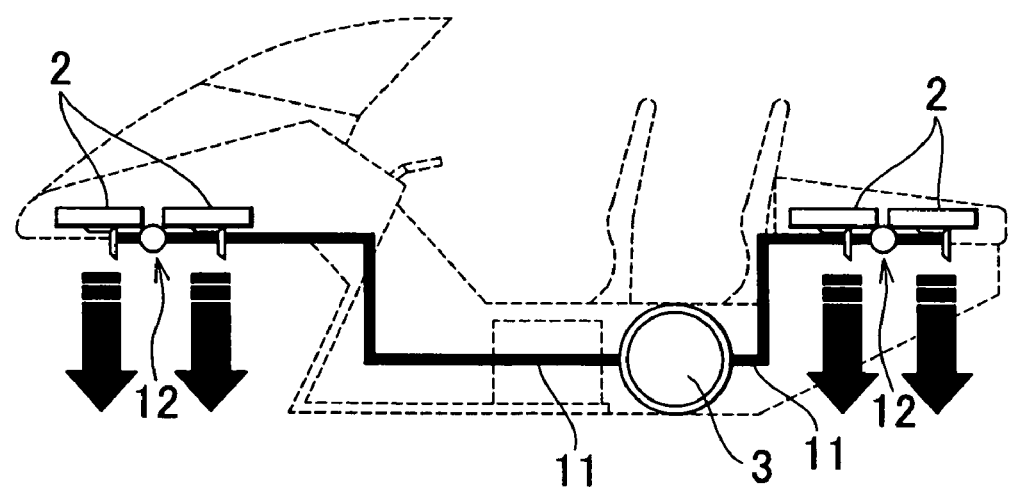

Various methods for driving the fans 2 can be employed, such as high-pressure gas, electric power, or motor shaft output. The prime movers 3 and the construction of the transmission system which transmits driving force to the fans 2 will differ depending on the drive method. One example of a high-pressure gas type transmission system is shown in FIGS. 2A and 2B. In this case, the prime movers 3 draw in air from intake ports (not shown) provided on the side or back surfaces, and compress it with a compressor. The compressed high-pressure gas is then transmitted through a pipe 10 and blown at input shafts of the fans 2 to make the fans 2 rotate. In a case where the motor shaft output method shown in FIG. 3 is used, rotation force of a shaft 11 output from the prime movers 3 is transmitted via a gear 12 to rotate the fans 2. Also, in a case in which the electric power method is used, electric power generated by the prime movers 3 is supplied through wiring to a motor of the fans 2 to rotate the fans 2.

The fans 2 rotate at high speed by the driving force supplied by the prime movers 3, and in doing so, create a downward (with respect to the aircraft 1) air stream (as shown by the arrows in the drawing). This downward air stream creates substantially upward vertical thrust with respect to the aircraft 1. The thrust generated by these fans 2 enables the aircraft 1 to take off and land vertically.

Figure 4:
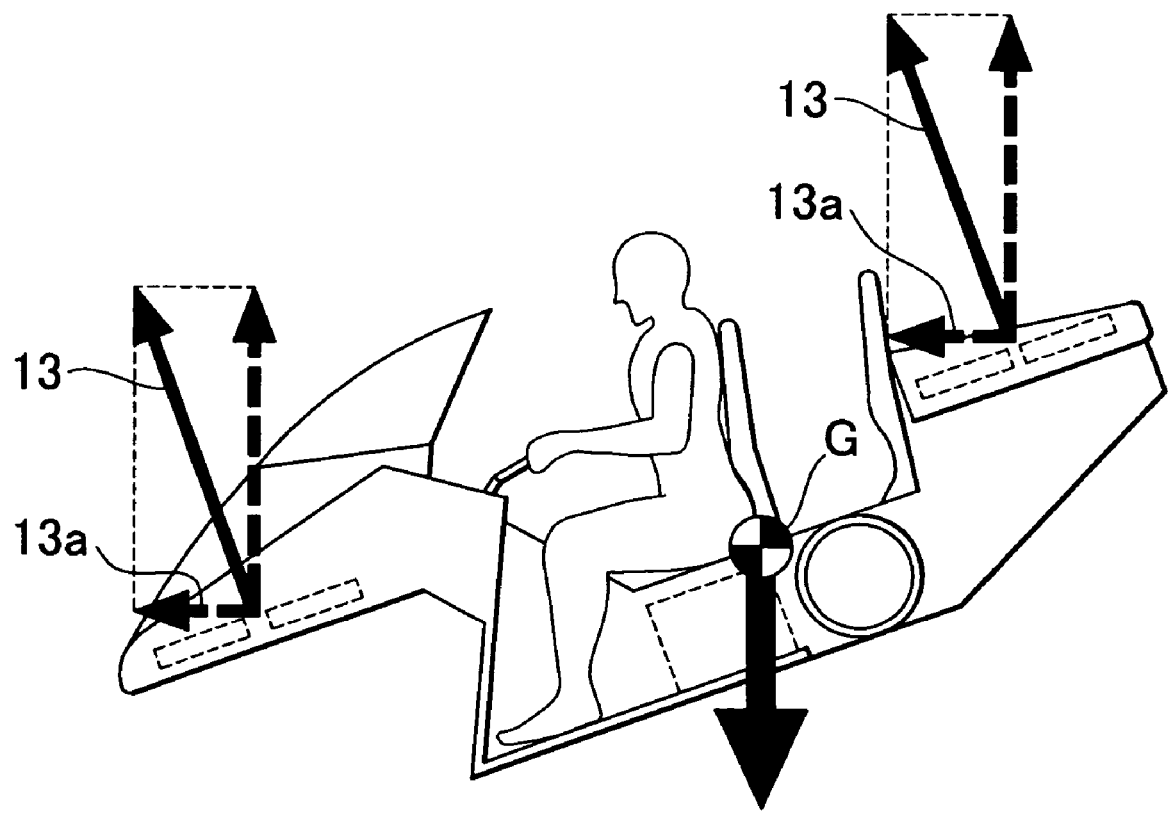
FIG. 4 is a view showing a flight attitude of the aircraft when flying forward.

After take-off, thrust is obtained to move the aircraft 1 forward, backward, left, or right, using a component of force 13a of the thrust 13 from the fans 2 by tilting the aircraft 1, as shown in FIG. 4. The tilt angle at this time can be adjusted by controlling the rotation speed of the fore and aft fans 2 using the yoke 7.

Figure 5:
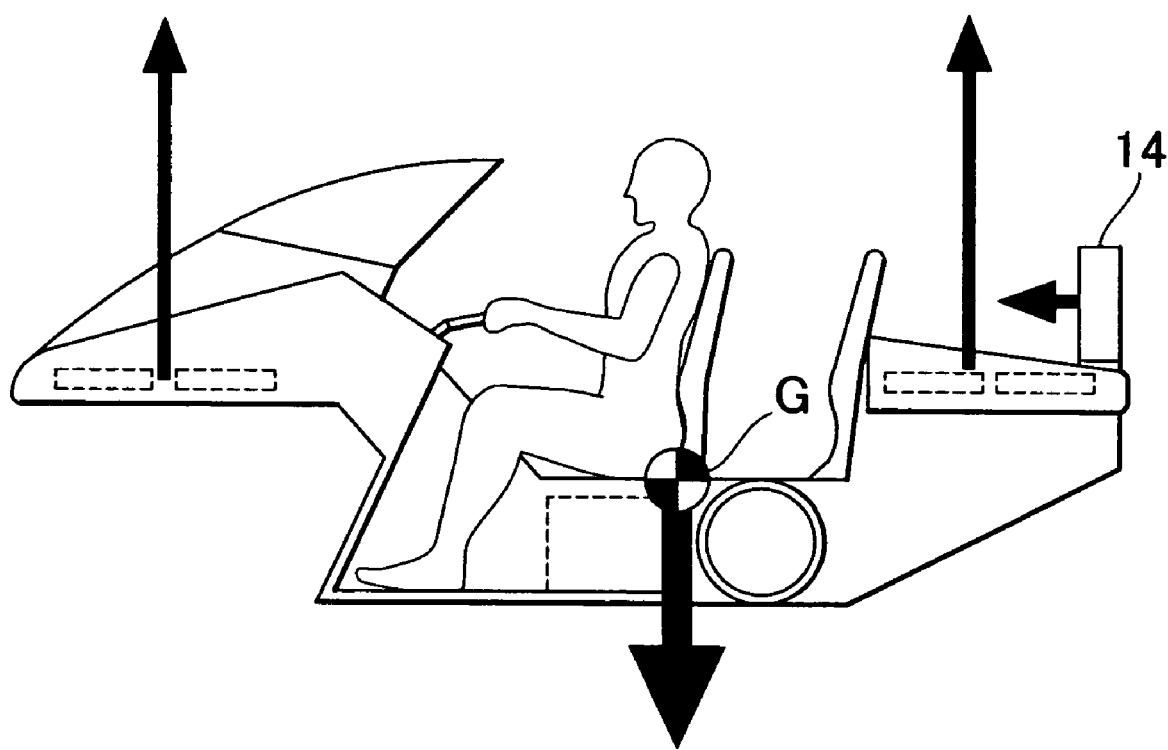
FIG. 5 is a view showing a modified example of the vertical take-off and landing aircraft according to the first exemplary embodiment, in which a second fan is provided for generating thrust in the forward direction.

Alternatively, instead of tilting the aircraft 1, a second fan 14 may also be provided for generating thrust to the front of the aircraft 1, as shown in FIG. 5. The rotation speed of this second fan 14 is also controlled using the yoke 7. The driving force for the second fan 14 may also be provided by the prime movers 3, just as is the driving force for the fans 2.

In the aircraft 1 structured as described above, the prime movers 3 and the sitting surface 4b of the occupant seat 4 are arranged both between, and lower than, the fans 2 at the aircraft front section 1A and the fans 2 at the aircraft rear section 1C. That is, the center of gravity G of the aircraft 1 is below the center of the aircraft, as shown in FIGS. 4 and 5. During flight, the center of gravity G tends to hang down due to the thrust from the fans at the front and rear of the aircraft 1, which increases stability of the aircraft 1 in flight and therefore improves safety.

Further, the width of the aircraft 1 is reduced due to the fact that the fans 2 are arranged at the front and rear of the aircraft 1, while the height of the aircraft 1 is reduced due to the fact that the occupant seat 4 has the occupant seated in a sitting posture. As a result, the aerodynamic moments which act on the aircraft due to air resistance and crosswinds and the like in flight are able to be suppressed, thereby improving both flight stability and fuel efficiency.

Also, it is possible to control the flight by controlling the rotation speeds of the fore and aft fans 2 or the second fan 14 by steering the yoke 7, which makes steering easier. In particular, providing the second fan 14 obviates the need to tilt the aircraft 1 during flight, thus further improving safety.

If the air stream from the fans 2 or the intake air stream to the prime movers 3 directly hits an occupant when the outside air temperature is low, as it is in winter for example, it may result in injury such as frostbite. Therefore, the layout in this exemplary embodiment is such that the occupant seat 4 is positioned between the fore and aft fans 2 so that the air stream from the fans 2 does not directly hit the occupant, thus preventing injury. In addition, the leg covers 9 provide a barrier between the steps 8 and the aircraft front section 1A, while the prime movers 3 provide a barrier between the steps 8 and the aircraft rear section 1C, thus preventing the occupant from accidentally being hit by the air streams. Further, the prime movers 3 are positioned below the occupant seat 4 and the intake ports of the prime movers 3 are located on the sides (to the outside of the step 8) or back faces so the intake air streams will not hit the occupant.

Figure 6:
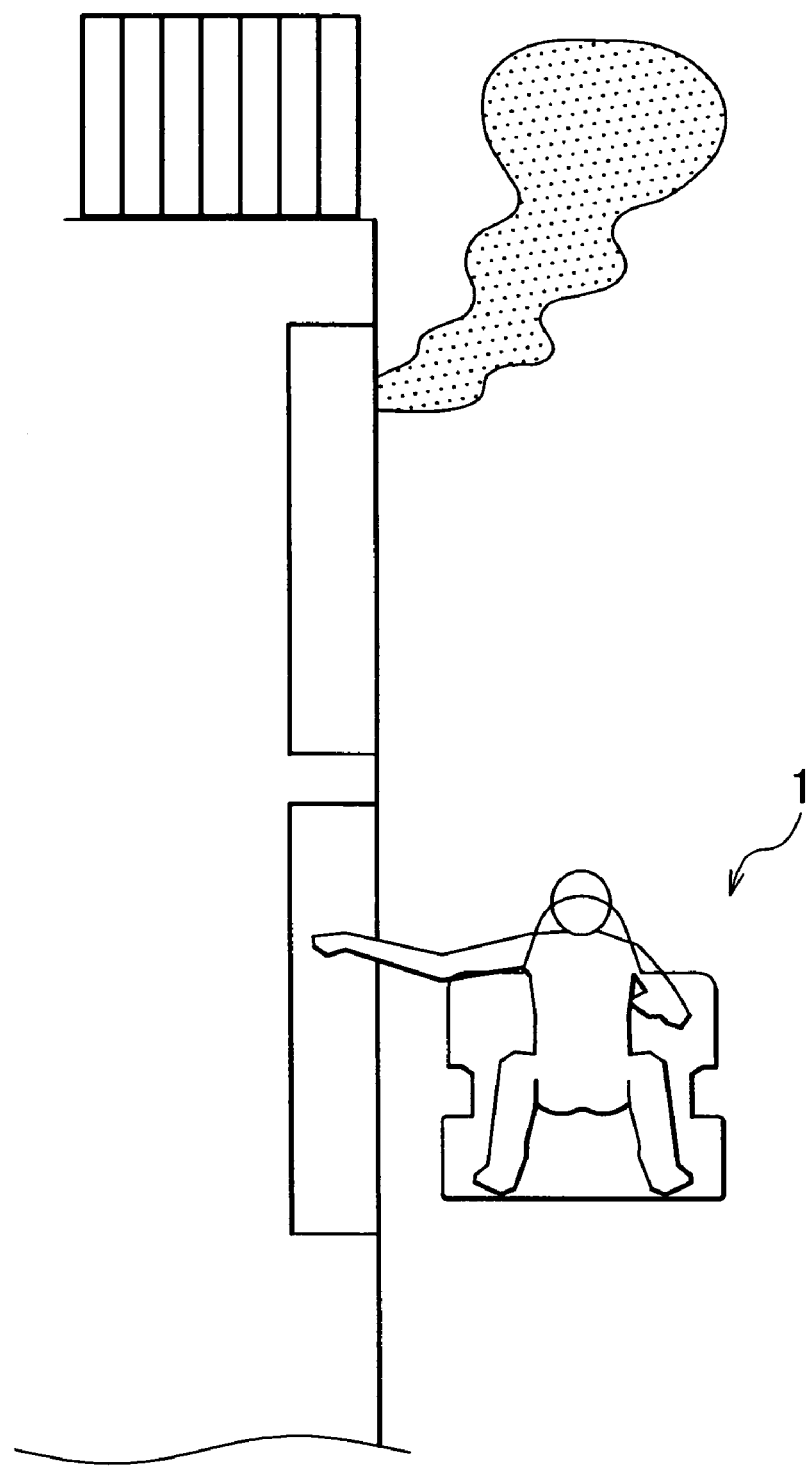
FIG. 6 is a view of the vertical take-off and landing aircraft close to a burning building.

Also, the fans 2 are arranged at the front and back of the aircraft 1, thus making it possible for the aircraft 1 to get close to an object such as a building from the side, as shown in FIG. 6. Further, the sides of the occupant seat 4 are open, thus enabling easy access to an object from the side of the aircraft 1. FIG. 6 shows the aircraft 1 close to a burning building for firefighting operations or to rescue a person.

In this exemplary embodiment, four fans 2 are provided at the front of the aircraft 1 and four fans 2 are provided at the back of the aircraft 1, making a total of eight fans 2. The number and arrangement of the fans 2 need not be limited to this, however. They may instead be changed as appropriate. For example, in a first modified example in FIG. 7, two fans 2 are provided at the front and two fans 2 are provided at the rear of the aircraft, and the prime mover 3 and one occupant seat 4 are provided in between. In a second modified example in FIG. 8, one fan 2 is provided at the front and one fan 2 is provided at the rear of the aircraft, and the prime mover 3 and one occupant seat 4 are provided in between. In these modified examples as well, arranging the fans 2, prime mover 3, and occupant seat 4 and the like as they are in the foregoing exemplary embodiment enables effects similar to those obtained in the first exemplary embodiment to be obtained.

A second exemplary embodiment of the invention is shown in FIGS. 9 to 11A and 11B. The second exemplary embodiment differs from the first exemplary embodiment in that, in the first exemplary embodiment the thrusts from all of the fans 2 are aimed vertically upwards, while in the second exemplary embodiment the fans 2 are arranged such that the directions of their respective thrusts intersect at a point that is substantially vertically above the center of gravity G of the aircraft. The rest of the structure is similar to that of the first exemplary embodiment, so the following description will focus mainly on the part that differs.

The aircraft according to this exemplary embodiment has two fans 2 at the aircraft front section and two fans 2 at the aircraft rear section, for a total of four fans 2. Each of the fans 2 is set at a horizontal tilt angle α (see FIG. 10A) and a vertical tilt angle β (see FIG. 11A), and mounted with the upper surface facing slightly to the inside of the aircraft. Accordingly, the directions of the thrusts of the fans 2 (i.e., the thrust axes) intersect at point P above the aircraft. The horizontal components of force of each of the thrusts balance out, such that the combined force of the thrusts can be regarded as a force that acts vertically upward at point P.

Meanwhile, the prime mover 3 and the sitting surface of the occupant seat 4 are set between, and lower than, the fans 2 at the aircraft front section and the fans 2 at the aircraft rear section, so that the center of gravity G of the aircraft falls substantially in the middle between the fore and aft fans 2, i.e., substantially vertically below point P.

Figure 10A:
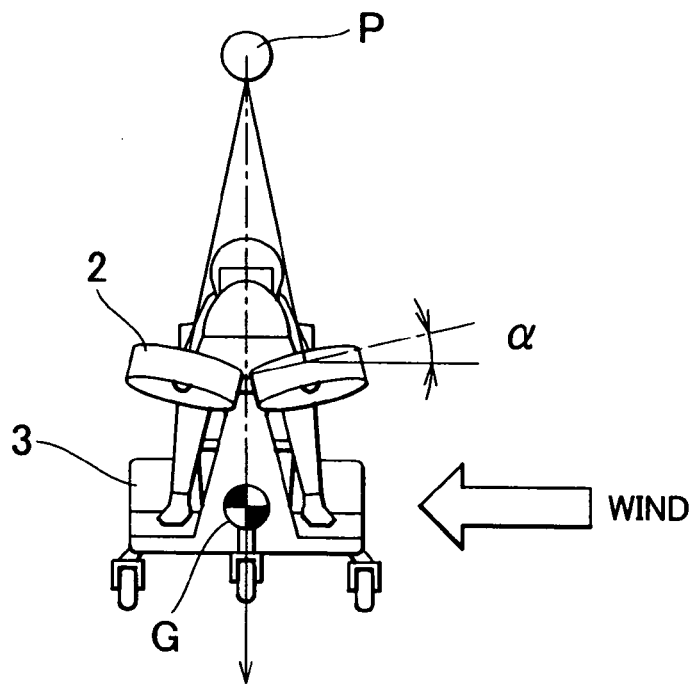
FIGS. 10A and 10B are views showing restorative force when the aircraft is tilted in the roll direction.
Figure 10B:
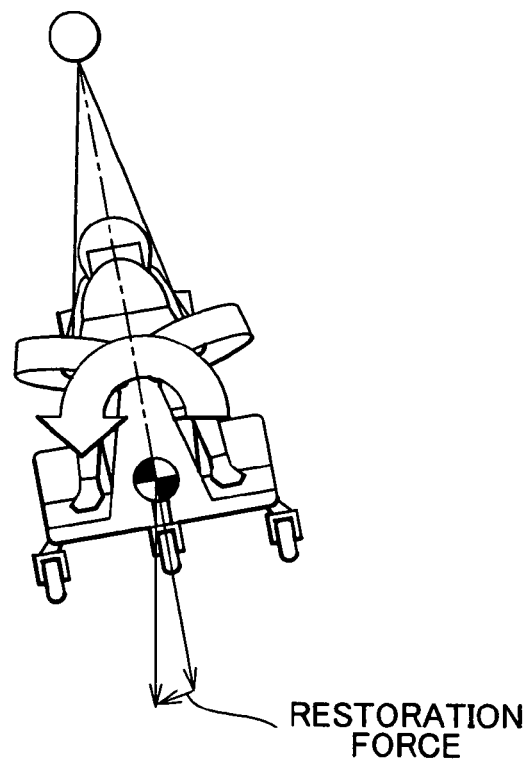
Figure 11A:
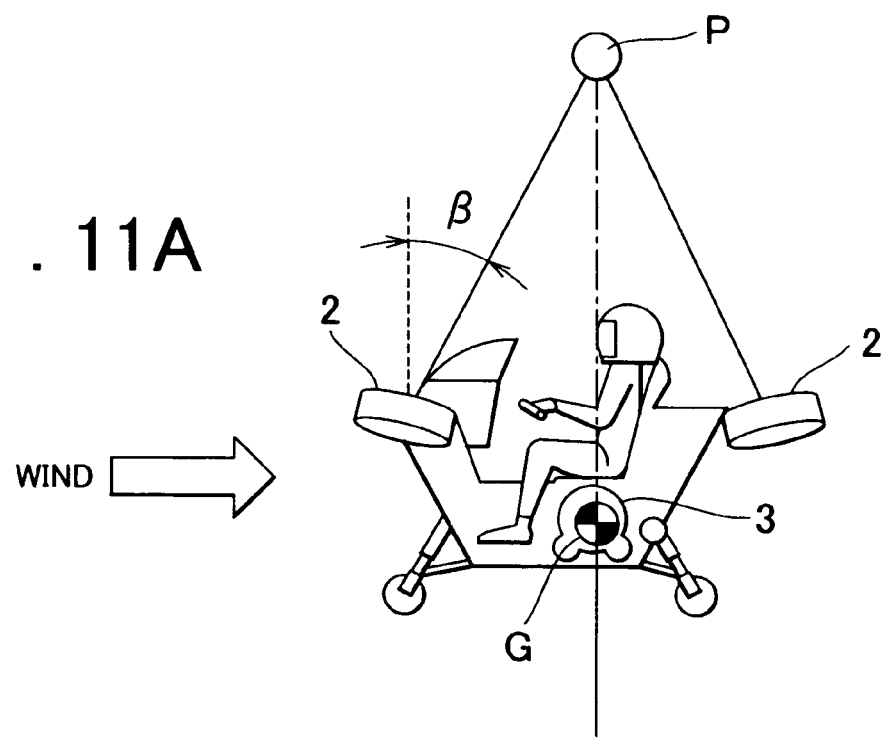
FIGS. 11A and 11B are views showing restorative force when the aircraft is tilted in the pitch direction.
Figure 11B:
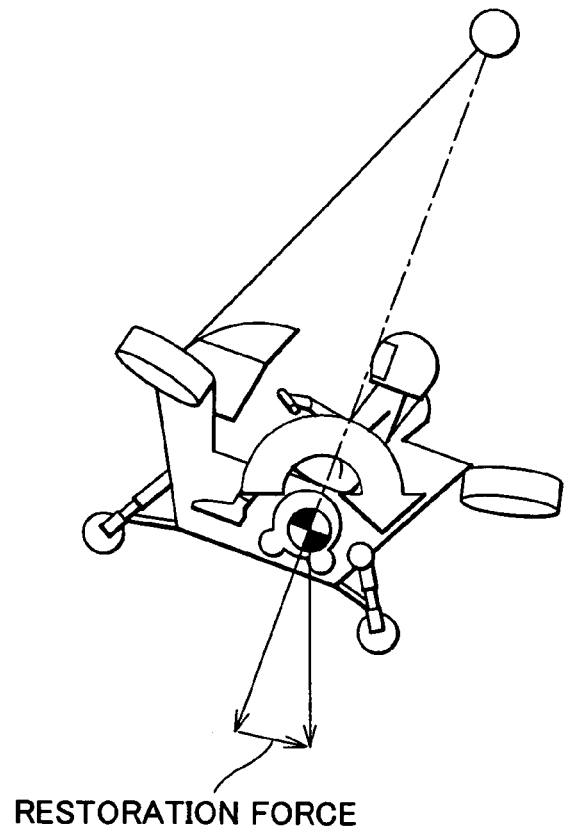
Figure 12A:
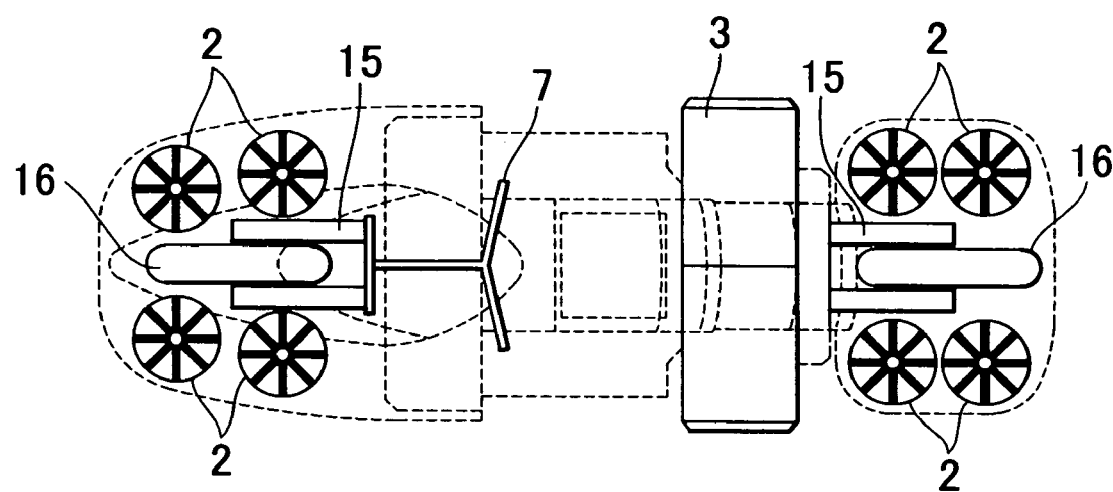
FIGS. 12A and 12B are views of a vertical take-off and landing aircraft according to a third exemplary embodiment of the invention.
Figure 12B:
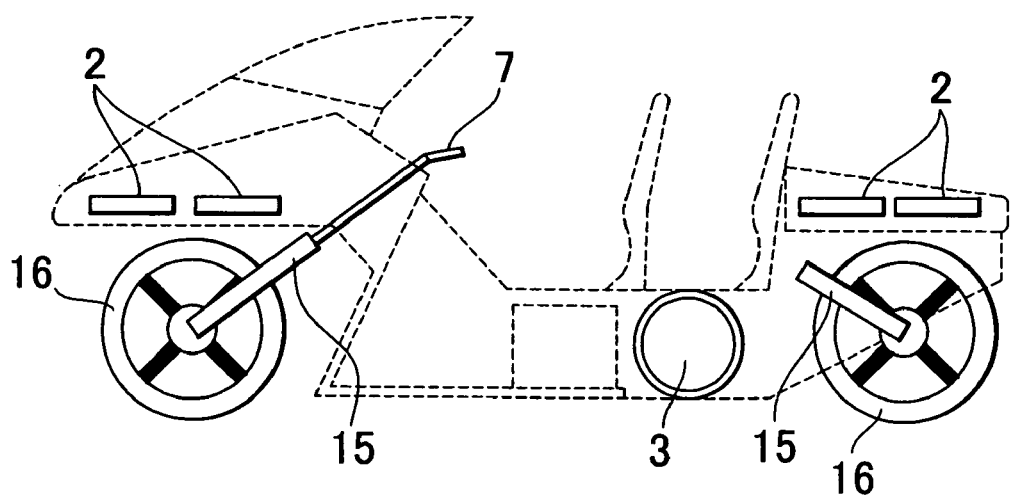

An aircraft with this kind of layout displays behavior similar to that of a single pendulum in which a weight with the center of gravity G hangs down from a fulcrum P. That is, as shown in FIGS. 10A and 10B, when aerodynamic moments generated by winds and the like act around the center of gravity G, causing the aircraft to tilt in the roll direction, restoration force is generated according to the pendulum principle in the direction to correct the tilt. Furthermore, as shown in FIGS. 11A and 11B, restoration force is also generated in the same way when the aircraft tilts in the pitch direction.

Therefore, the structure of this exemplary embodiment further improves aircraft stability during flight even more so than the structure of the first exemplary embodiment. Improving aircraft stability enables the horsepower (i.e., control power) for attitude control to be reduced, thereby improving fuel efficiency, such that, under the same fuel conditions, for example, flying time can be increased.

A third exemplary embodiment of the invention is shown in FIGS. 12A and 12B and 13A and 13B. The aircraft according to this exemplary embodiment has wheels enabling it to run on the ground. The other structure is similar to that of the foregoing exemplary embodiment, so the following description will focus mainly on the part that differs.

Wheels 16 for running on the ground are mounted to the aircraft front and rear sections via impact-absorbing devices 15. The wheels 16 may use as their driving source the prime mover 3 of the fans 2, or a motor provided which is driven by electric power generated by the prime mover 3. The wheel 16 at the aircraft front section can be turned to the left and right by steering the yoke 7.

When running on the ground, the fans 2 are stopped and the aircraft moves by rotating only the wheels 16. The direction of movement is changed by steering the yoke 7, which improves maneuverability on the ground. Furthermore, by moving the aircraft using the wheels 16 in areas where running on the ground is possible, and flying only above water or when altitude is necessary, fuel consumption can be reduced, thus enabling operating time to be greatly increased.

Figure 13A:
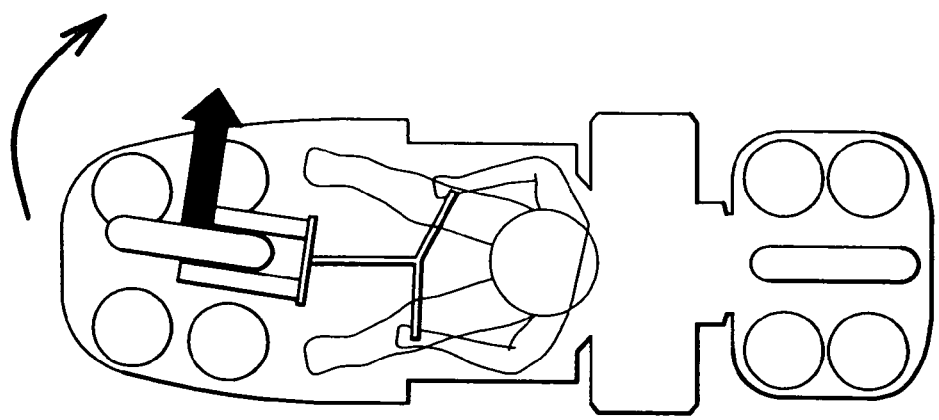
FIGS. 13A, 13B, and 13C are views showing a gyro moment generated in the yaw direction in response to the steering of a wheel.
Figure 13B:
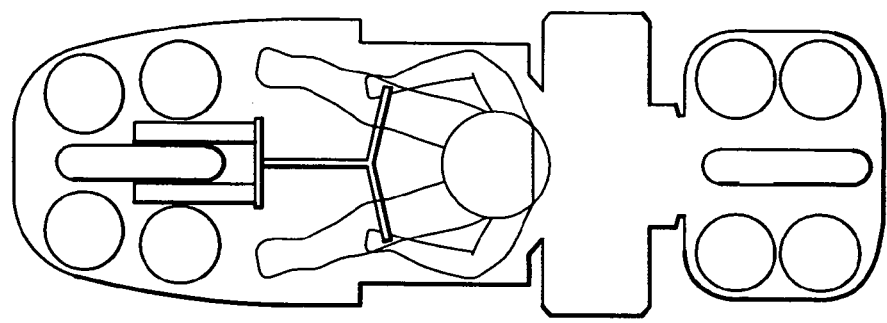
Figure 13C:
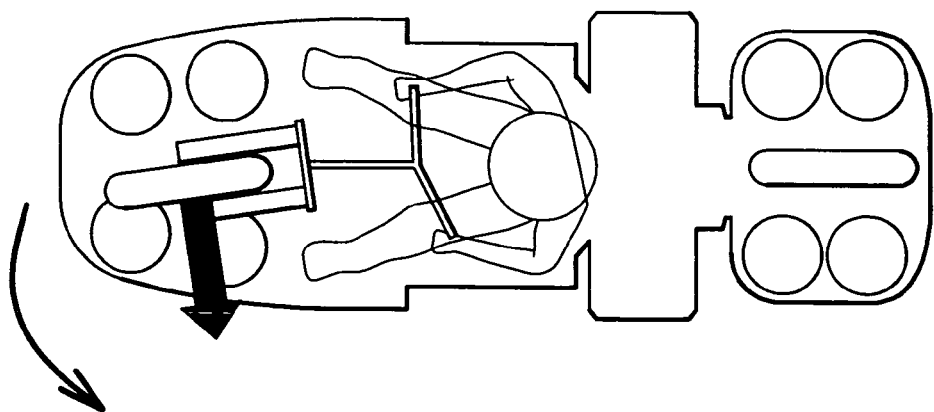

On the other hand, in flight both the fans 2 and the wheels 16 are driven. When the yoke 7 is steered to turn the wheel 16, a gyro moment is generated in the wheel 16 in a direction orthogonal to both the rotational axis and the turning axis. That is, when the wheel 16 is turned to the right, as shown in FIG. 13A, a force to the right in the yaw direction acts on the wheel 16. Similarly, when the wheel 16 is turned to the left, as shown in FIG. 13C, a force to the left in the yaw direction acts on the wheel 16. In this way, providing the wheel 16 enables the attitude in the yaw direction to be changed even during flight.

A fourth exemplary embodiment of the invention is shown in FIGS. 14 to 17. The aircraft according to this exemplary embodiment is provided with means for adjusting the attitude in the roll direction. The rest of the structure is similar to that of the foregoing exemplary embodiment, so the following description will focus mainly on the part that differs.

Figure 14:
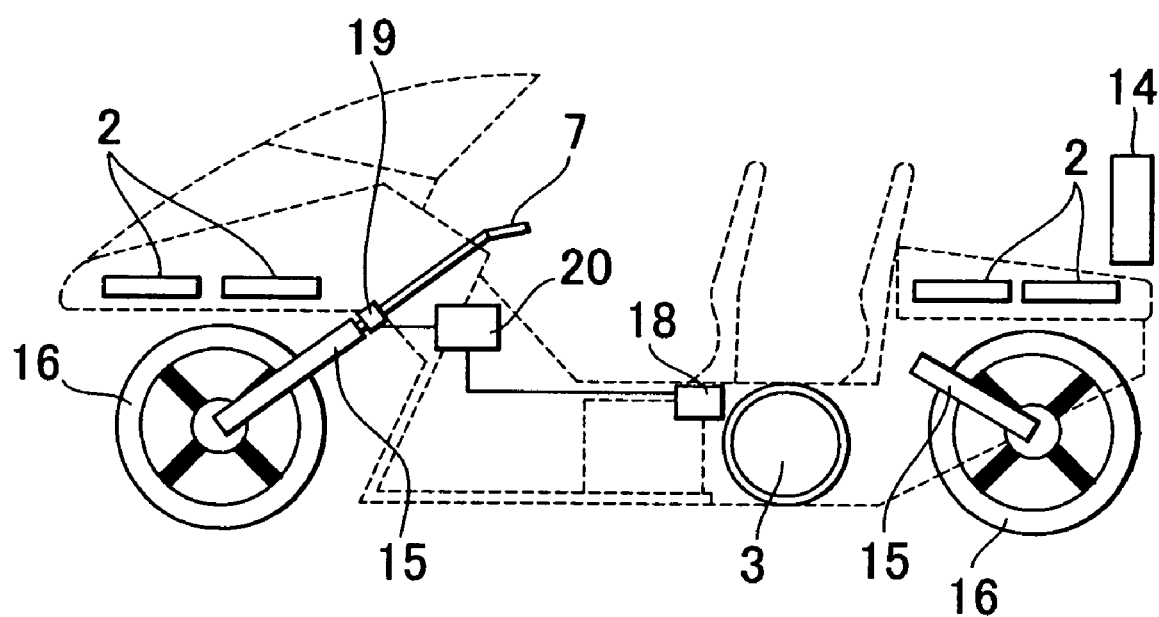
FIG. 14 is a view of a vertical take-off and landing aircraft according to a fourth exemplary embodiment of the invention.

As shown in FIG. 14, the wheels 16 for running on the ground are mounted to the aircraft front and rear sections via impact-absorbing devices 15. The wheels 16 may use as their driving source the prime mover 3 of the fans 2, or a motor provided which is driven by electric power generated by the prime mover 3. The wheel 16 on the aircraft front section can be turned to the left and right by steering the yoke 7.

Also provided on the aircraft are a gyro (detecting means) 18 for detecting the attitude angle of the aircraft, a tilt mechanism 19 that enables the wheels 16 to tilt in the roll direction, and an attitude control computer 20 which controls the attitude of the aircraft. The gyro 18 and the tilt mechanism 19 are connected to the attitude control computer 20. Here, the attitude control computer 20 serves to adjust the tilt angle of the wheels 16 in response to the attitude angle during flight.

The structure of the tilt mechanism 19 will now be described in more detail with reference to FIGS. 15A, 15B, and 15C and 16. The tilt mechanism 19 has a pair of left and right actuators 21. The lower end of each actuator 21 is connected via a connecting portion 22 to a wheel unit 23 which includes the wheel 16 and the impact-absorbing device 15. The connecting portion 22 connects the actuator 21 and the wheel unit 23 so that they are able to rotate with respect to one another in the roll direction.

The actuator 21 includes a step motor 24, an output shaft 25, an expanding/contracting portion 26 and the like. When a control signal is input from the attitude control computer 20 provided in the aircraft to the step motor 24, the step motor 24 rotates a number of rotations corresponding to the control signal. As the step motor 24 rotates, the output shaft 25, which is cut like a screw, turns, which raises or lowers (depending on the direction of rotation) the expanding/contracting portion 26, making the actuator 21 longer or shorter accordingly.

Figure 15A:
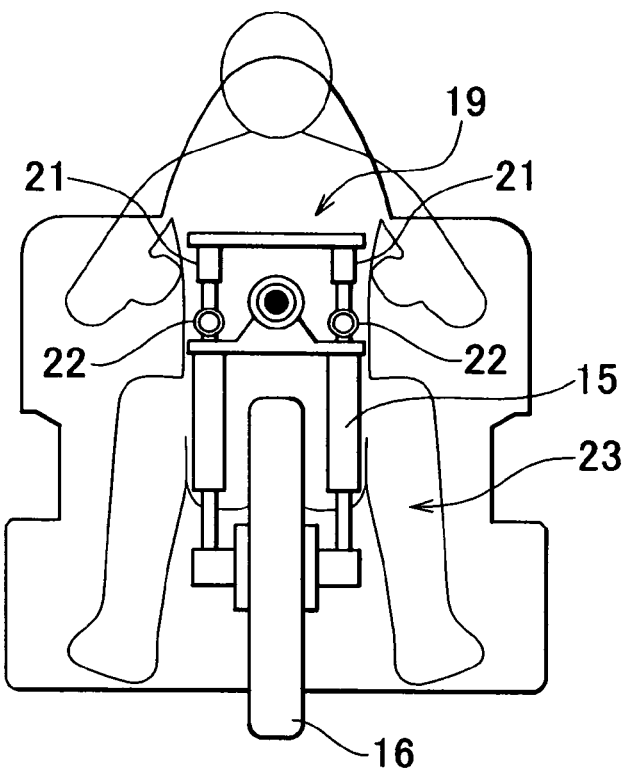
FIGS. 15A, 15B, and 15C are views showing the structure of a tilt mechanism in the vertical take-off and landing aircraft according to the fourth exemplary embodiment.
Figure 15B:
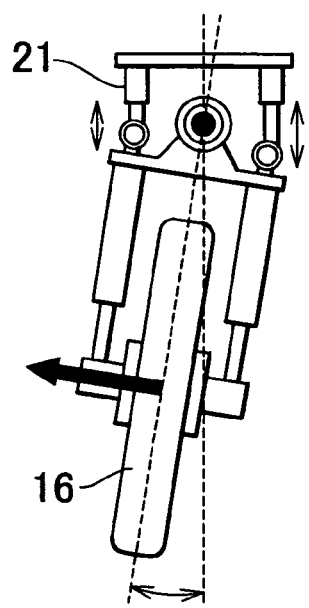
Figure 15C:
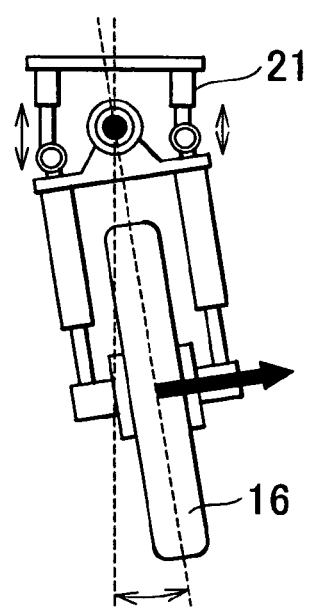
Figure 16:
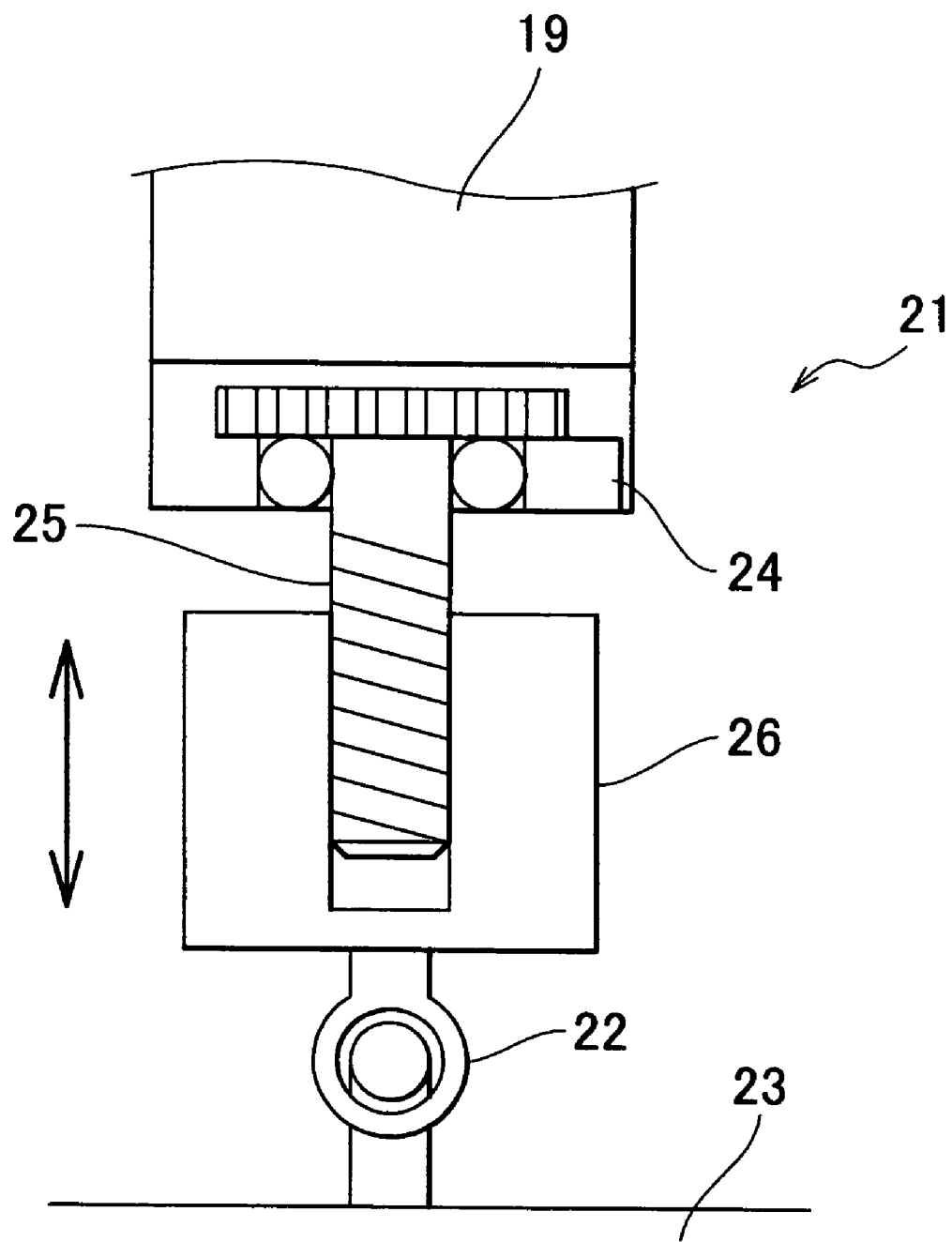
FIG. 16 is a view of the structure of an actuator in the vertical take-off and landing aircraft according to the fourth exemplary embodiment.

The left and right actuators 21 can be controlled independently, so their lengths can be made different from one another. Making the lengths of the actuators 21 different from one another determines the tilt angle of the wheel unit 23 (the wheel 16). That is, when the lengths of the right and left actuators 21 are the same, as shown in FIG. 15A, the wheel 16 is vertical. On the other hand, when the actuator 21 on the right side of the aircraft is made shorter than the actuator 21 on the left side, the wheel 16 tilts to the right in the roll direction, as shown in FIG. 15B. Similarly, when the actuator 21 on the left side of the aircraft is made shorter than the actuator 21 on the right side, the wheel 16 tilts to the left in the roll direction, as shown in FIG. 15C.

Figure 17:
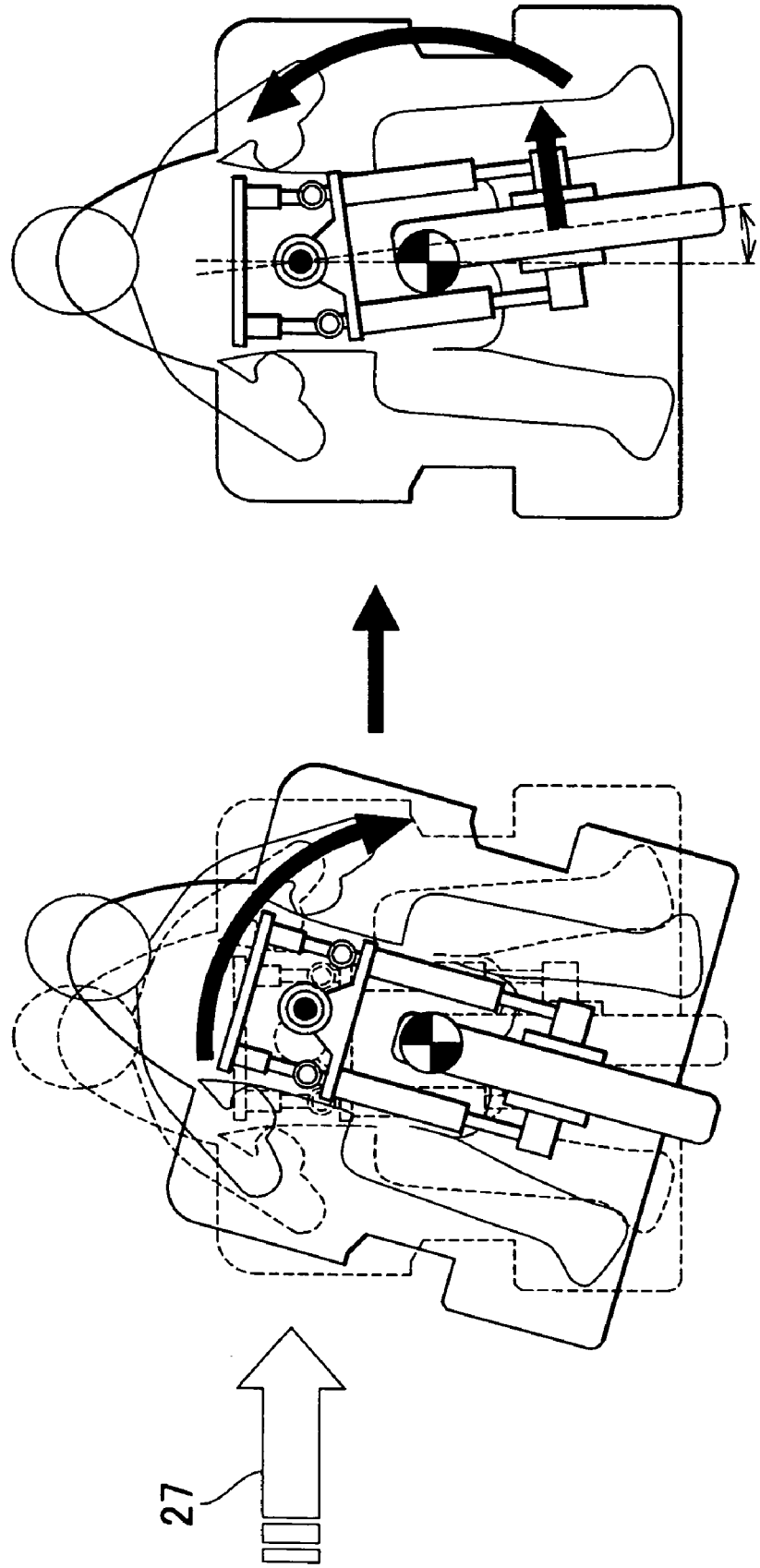
FIG. 17 is a view showing the aircraft when attitude control in the roll direction is performed by tilting the wheel.

FIG. 17 shows what this attitude control looks like during flight. In flight, the wheels 16 rotate at a constant speed. When a crosswind 27 or the like hits the aircraft and causes the attitude of the aircraft to change, the attitude angle of the aircraft is detected by the gyro 18 and the detection value is input to the attitude control computer 20. The attitude control computer 20 then calculates the direction and angle to tilt the wheel 16 based on the detected attitude angle. The calculation result is then sent to the step motor 24 in the form of a rotation number control signal. In the example shown in the drawing, the aircraft has rolled to the left due to the crosswind 27 so a restoration moment is generated to tilt the wheel 16 to the left so as to roll the aircraft to the right.

In this way, the structure of this exemplary embodiment enables the attitude to be automatically corrected when the aircraft is tilted due to wind or the like, thereby improving aircraft stability during flight.

A fifth exemplary embodiment of the invention is shown in FIGS. 18A, 18B, 18C to 20. The aircraft according to this exemplary embodiment has a protective member in which is housed a parachute. The rest of the structure is similar to that of the foregoing exemplary embodiment, so the following description will focus mainly on the part that differs.

Figure 18A:
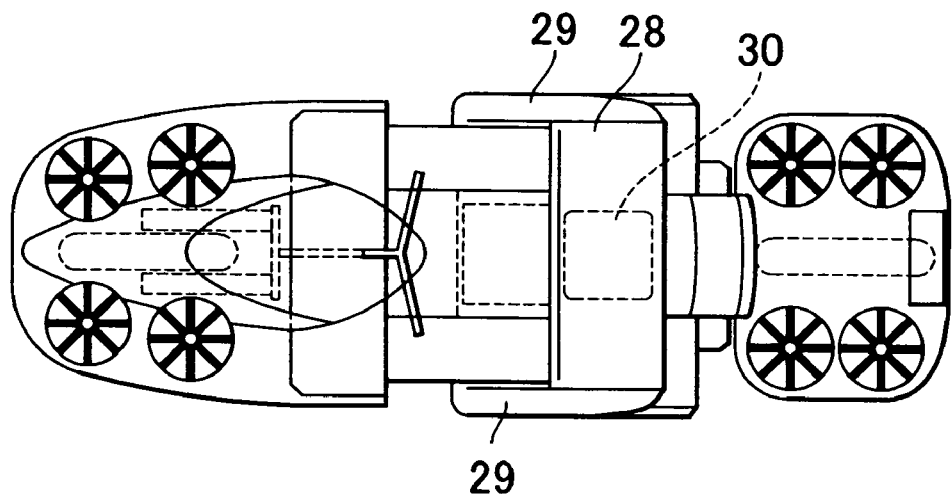
FIGS. 18A, 18B, and 18C are views of a vertical take-off and landing aircraft according to a fifth exemplary embodiment of the invention.
Figure 18B:
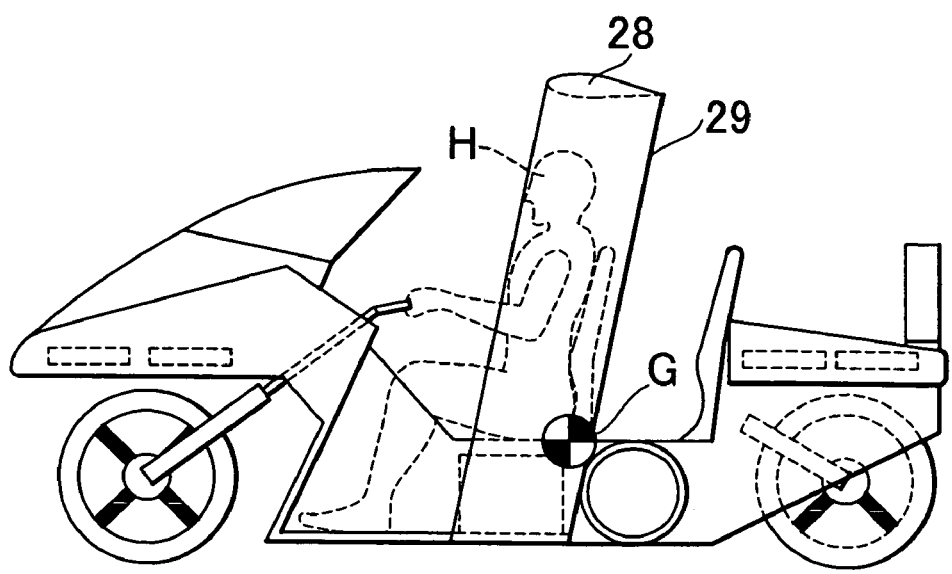
Figure 18C:
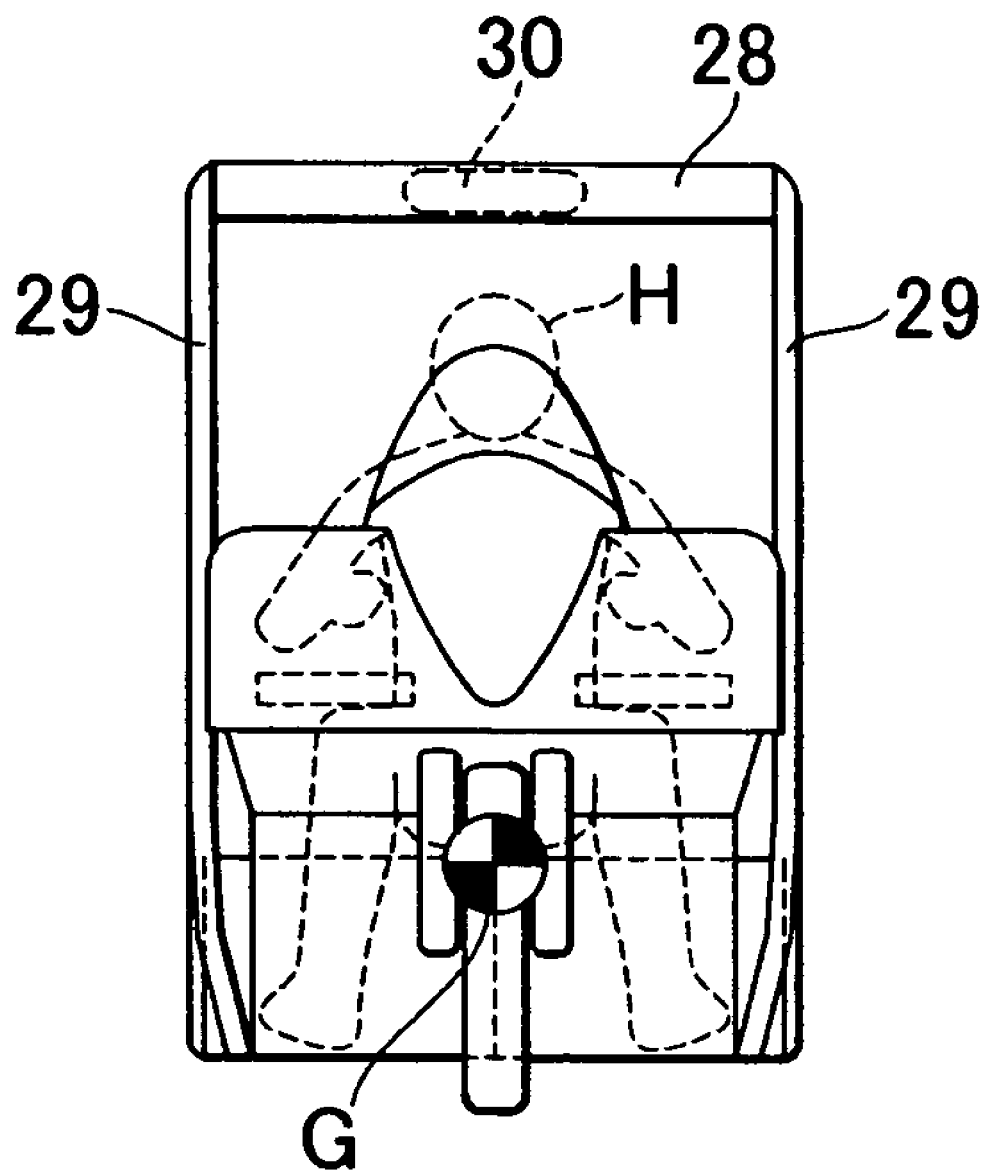

As shown in FIGS. 18A, 18B, and 18C, the aircraft is provided with a protective member 28 which covers the top of the operator's H head. This protective member 28 is supported by support members 29 provided to the left and right of the occupant seat 4, and is substantially vertically above from the center of gravity G of the aircraft. The protective member 28 and the support members 29 serve to protect the occupant in the event that the aircraft rolls or the like.

The protective member 28 has a wing-shaped cross-section. The aspect ratio thereof is preferably set to a value where the air resistance is low and maximum lift can be obtained, such as approximately 6. As a result, lift is generated at the upper surface of the protective member 28, which helps the aircraft to ascend, reducing the need for power and thereby improving fuel efficiency.

Figure 19:
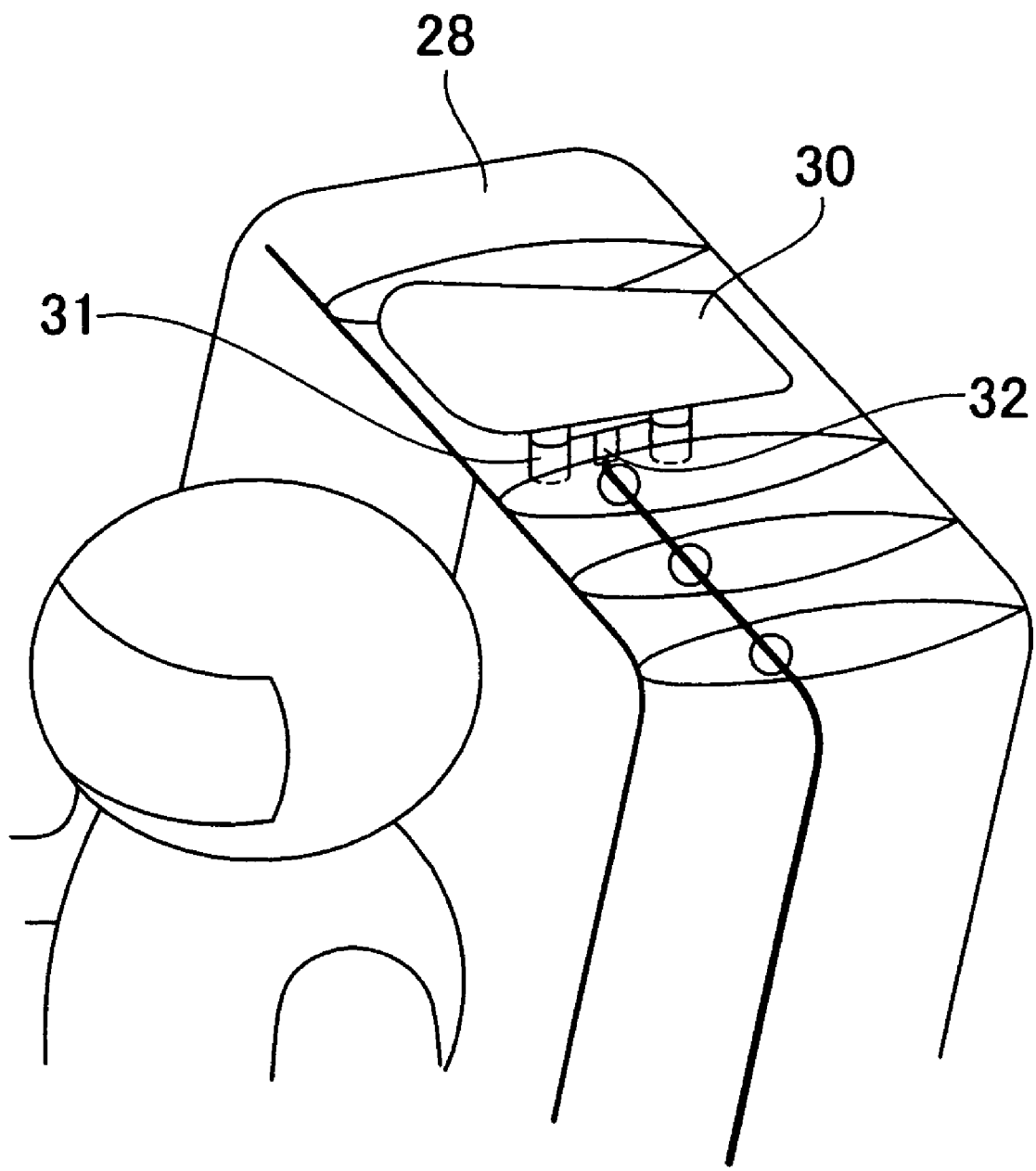
FIG. 19 is a view of a parachute housed in a protective member.

Also, as shown in the transparent view of FIG. 19, an emergency parachute 30 is housed in the inside center portion of the protective member 28, using the space inside the wing-shaped area. A powder 31 for deploying the parachute 30 is provided between the parachute 30 and the bottom surface of the protective member 28. This powder 31 is connected to an ignition plug 32. The ignition plug 32 is connected to both the attitude control computer and a manual switch on the control panel. The bottom end of the line of the parachute 30 is fixed to the aircraft at a point substantially vertically above of the center of gravity G of the aircraft.

Figure 20:
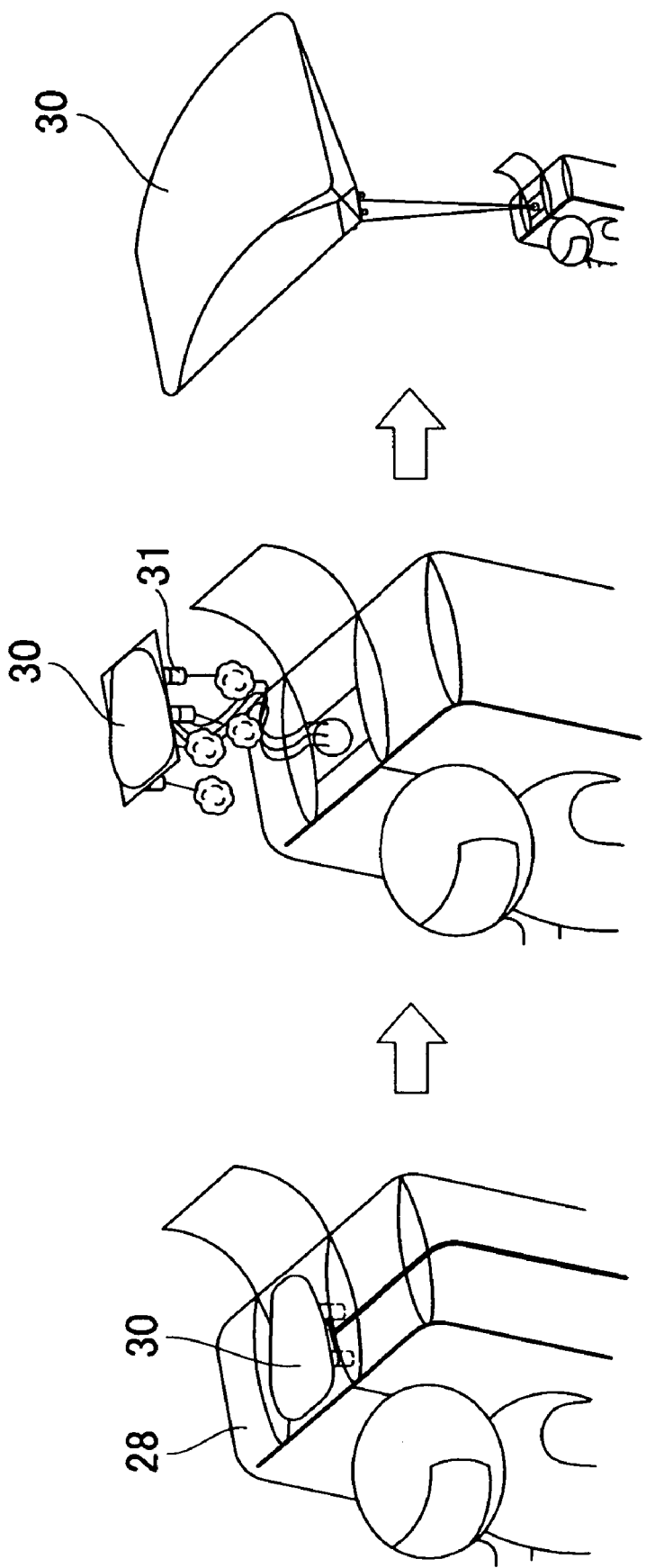
FIG. 20 is a view showing the manner in which the parachute deploys.

FIG. 20 shows the parachute being deployed. When the attitude control computer determines that the aircraft is falling, or when the operator H operates the manual switch, a signal is sent to the ignition plug 32 to ignite the powder 31. When the powder 31 ignites, the parachute 30 is deployed above the aircraft. The parachute 30 is opened by wind pressure generated by the falling aircraft and slows the rate of decent of the aircraft.

Thus, it is possible to prevent the aircraft from crashing and thus ensure the safety of the occupant even if the aircraft is unable to be controlled due to crosswinds or turbulence or the like.

Further, because the parachute 30 is provided inside the protective member 28 and the injection gas of the powder 31 for deploying the parachute 30 is blocked from the occupant by the bottom surface of the protective member 28, the occupant is not subject to any danger.

Moreover, during a parachute decent the aircraft attitude is able to be kept stable because the parachute 30 is fixed to the aircraft substantially vertically above the center of gravity G of the aircraft.

A sixth exemplary embodiment of the invention is shown in FIGS. 21A and 21B to 24. The aircraft according to this exemplary embodiment has a jet nozzle for generating auxiliary thrust. The other structure is similar to that of the foregoing exemplary embodiment, so the following description will focus mainly on the part that differs.

Figure 21A:
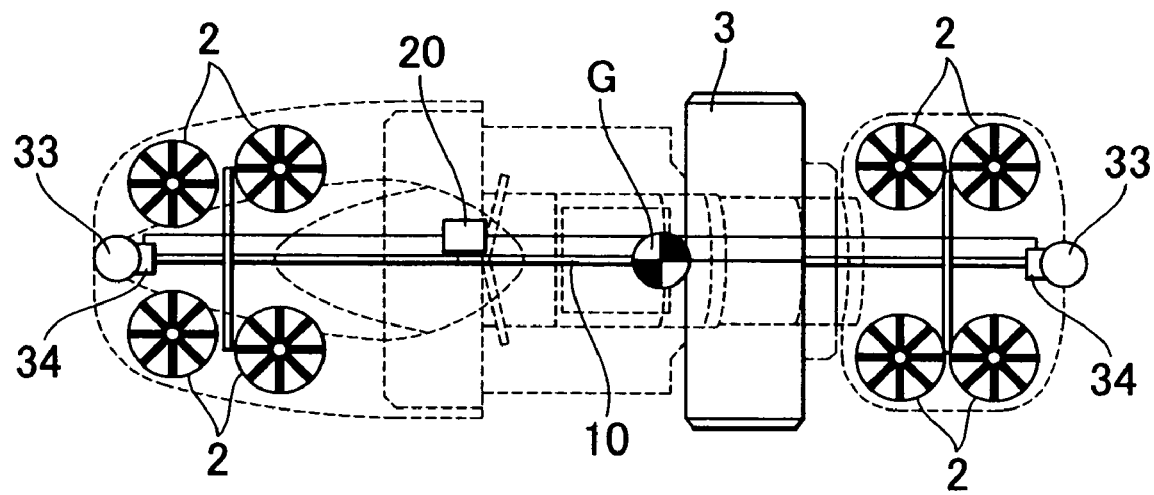
FIGS. 21A and 21B are views of a vertical take-off and landing aircraft according to a sixth exemplary embodiment of the invention.
Figure 21B:
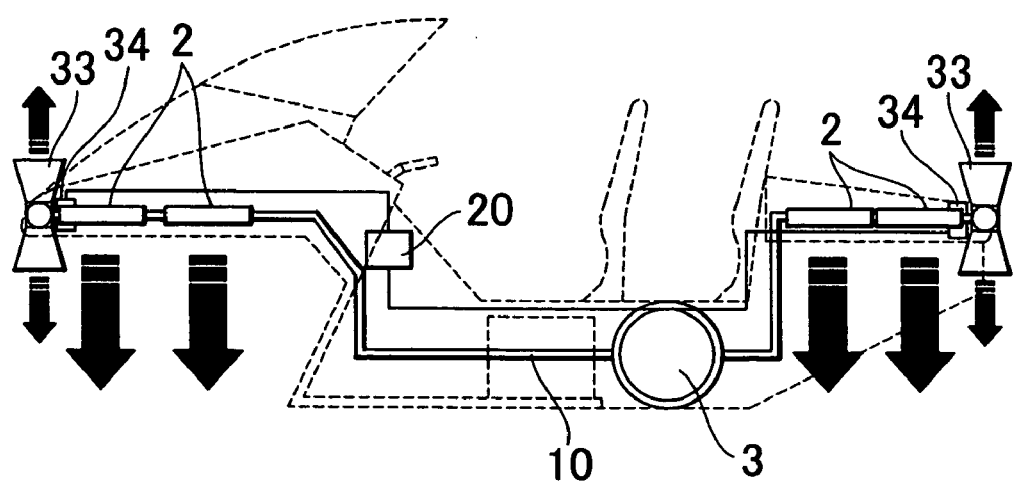

As shown in FIGS. 21A and 21B, an air jet nozzle 33 is provided at both the front and rear sections of the aircraft. The air jet nozzles 33 are arranged in positions symmetrical with respect to a perpendicular line through which the center of gravity G of the aircraft passes, i.e., they are arranged on a plane through which the center axis of the aircraft and the center of gravity G of the aircraft pass.

The air jet nozzles 33 are connected to a high-pressure gas type prime mover 3 and a pipe 10. Each air jet nozzle 33 has two nozzles, one facing up and one facing down. Thrust is generated by blasting high-pressure gas either upward or downward from the nozzles. This thrust generating principle therefore differs from the fans 2 which use high-pressure gas as a rotational driving force.

A control valve 34 connected to the attitude control computer 20 is provided between the air jet nozzles 33 and the pipe 10. This control valve 34 switches the nozzles of the air jet nozzles 33 and controls the blast amount and the like in response to control signals from the attitude control computer 20.

Figure 22A:
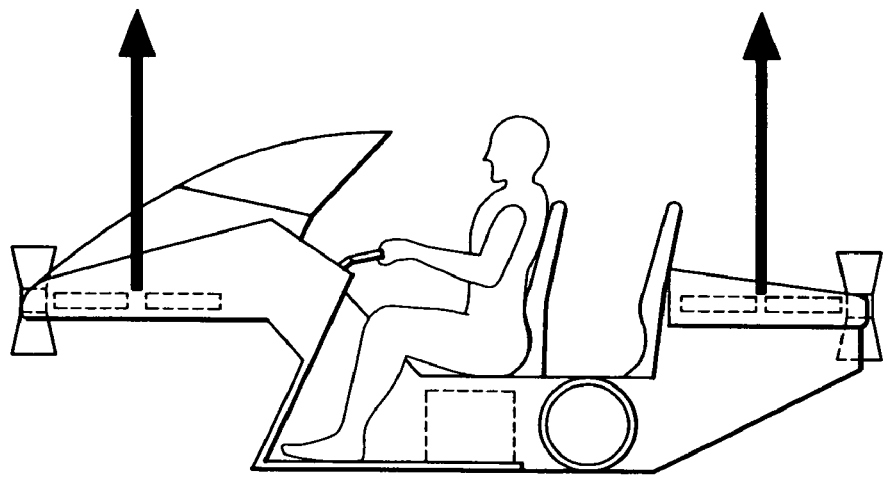
FIGS. 22A and 22B are views illustrating the difference in the vertical thrust when the aircraft is in a level (i.e., horizontal) attitude as compared to a tilted attitude.
Figure 22B:
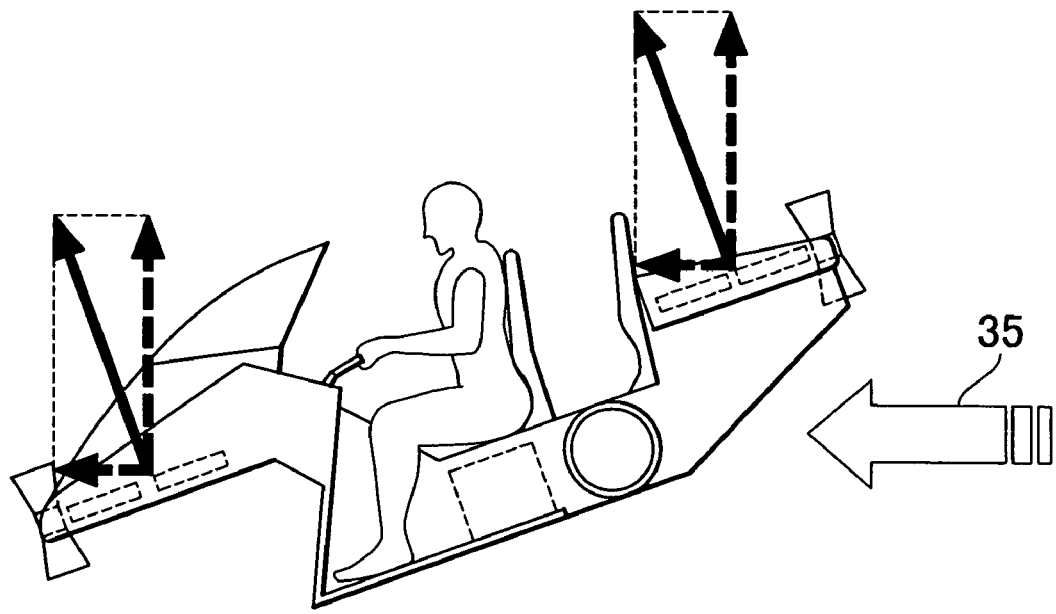
Figure 23:
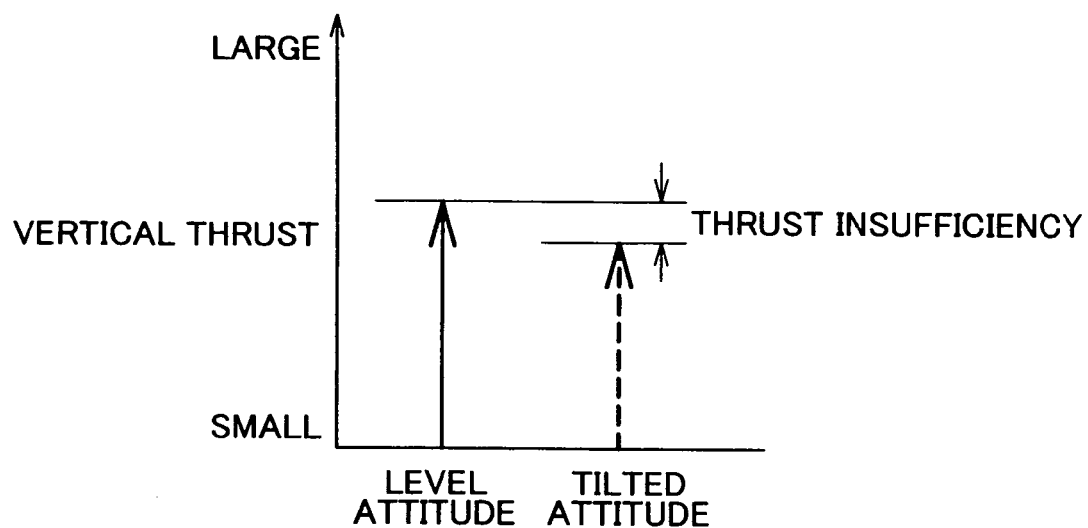
FIG. 23 is a view illustrating the shortage of vertical thrust when the aircraft is in a tilted attitude as compared to a level attitude.

As shown in FIG. 22A, when the aircraft is flying in a level attitude, the thrust axes of the fans 2 are pointing almost vertically upward so the thrust in the vertical direction is at its greatest. In contrast, as shown in FIG. 22B, when the aircraft is in a tilted attitude, such as when the aircraft changes its attitude angle or when the aircraft is tilted due to a wind disturbance 35, the thrust axis is also tilted, which means that the thrust (component of force) in the vertical direction is decreased and altitude will be lost. FIG. 23 illustrates the shortage of vertical thrust when the attitude is tilted as compared to when the attitude is horizontal.

Figure 24:
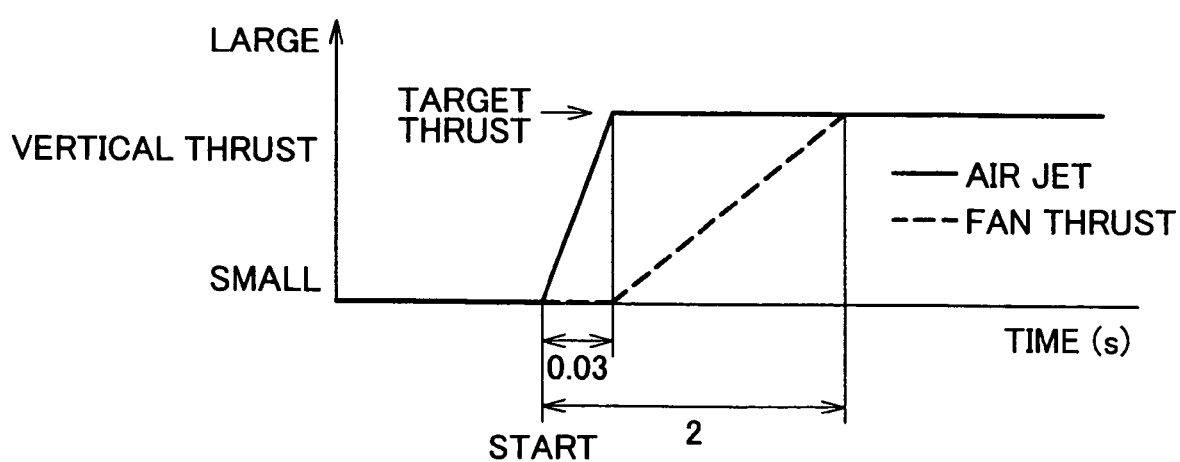
FIG. 24 is a view illustrating the difference in response time of a fan and an air jet nozzle.

When the attitude control computer 20 detects that the attitude of the aircraft is tilted or that the aircraft is losing altitude, the attitude control computer 20 increases the rotation speed of the fans 2, which serve as the main thrust generators, in order to compensate for the shortage of thrust. As described above, however, with jet engine type thrust generators such as the fans 2, there is a large time loss due to the energy conversion so the response time until the target thrust is achieved is poor. More specifically, it takes approximately two seconds until the target thrust is achieved, as shown in FIG. 24.

According to this exemplary embodiment, the attitude control computer 20 therefore increases the rotation speed of the fans 2 while also controlling the control valve 34 to generate auxiliary thrust with the air jet nozzles 33. As shown in FIG. 24, the response time of the air jet nozzles 33 is good, at 0.03 seconds, which makes it possible to rapidly compensate for the shortage of vertical thrust and thereby keep the change in flying altitude down to a minimum. The attitude control computer 20 reduces the blast amount from the air jet nozzles 33 as the main thrust from the fans 2 increases, and turns the air jet nozzles 33 off when the main thrust reaches the target thrust.

According to the method described above, it is possible to always maintain a substantially constant flying altitude, regardless of the attitude of the aircraft, which simplifies maneuvering and improve safety.

Also, the fact that the fore and aft air jet nozzles 33 are disposed in positions symmetrical with respect to a vertical line through which the center of gravity G of the aircraft passes enables a stable aircraft attitude to be maintained without excess moment from the auxiliary thrust acting on the aircraft.

In this exemplary embodiment only a downward jet blast was described. In cases such as when the attitude of the aircraft is to be changed from tilted to horizontal, or when the aircraft gains altitude by wind disturbance, however, an upward jet blast can be used to generate a negative auxiliary thrust downward. Also, a combination of upward and downward jet blasts can be used to rapidly correct an aircraft attitude that is tilted in the pitch direction.

Figure 7:
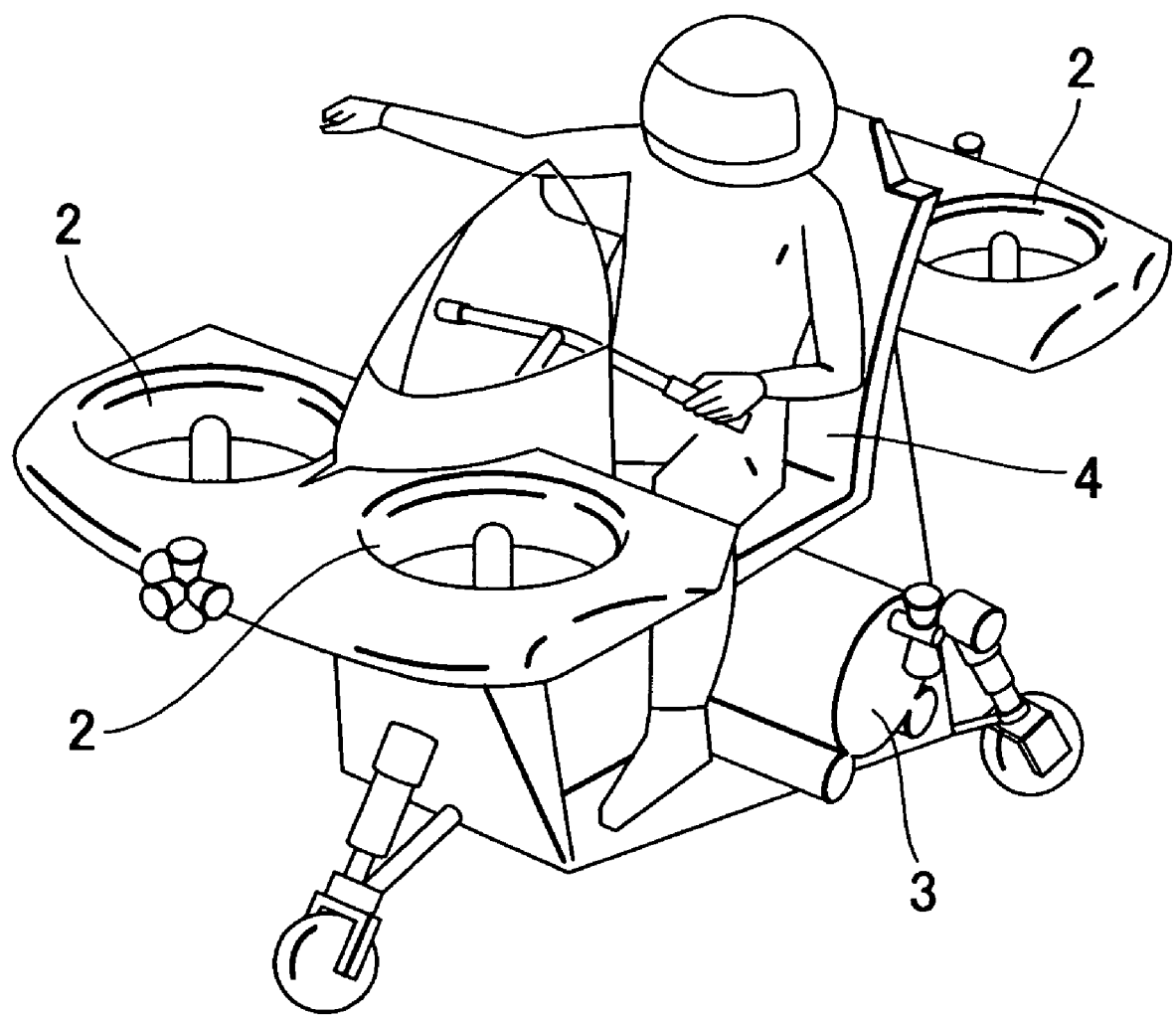
FIG. 7 is a modified example of the vertical take-off and landing aircraft according to the first exemplary embodiment.
Figure 8:
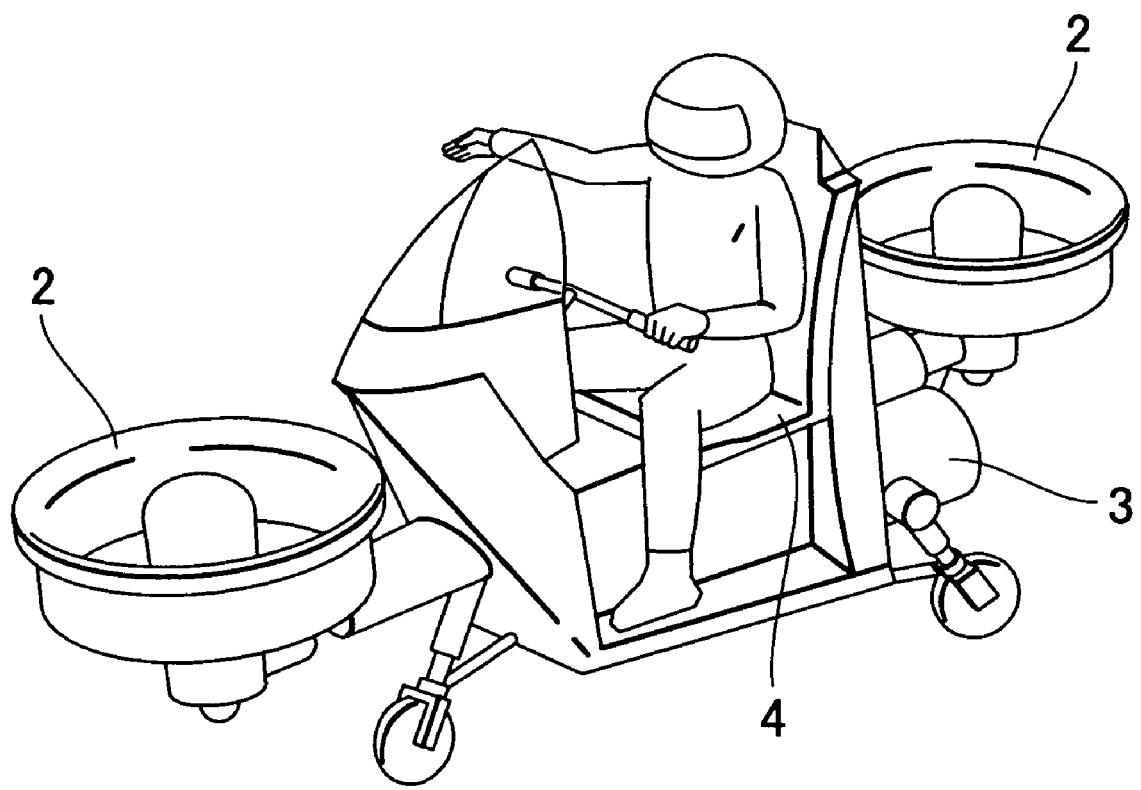
FIG. 8 is another modified example of the vertical take-off and landing aircraft according to the first exemplary embodiment.
Figure 9:
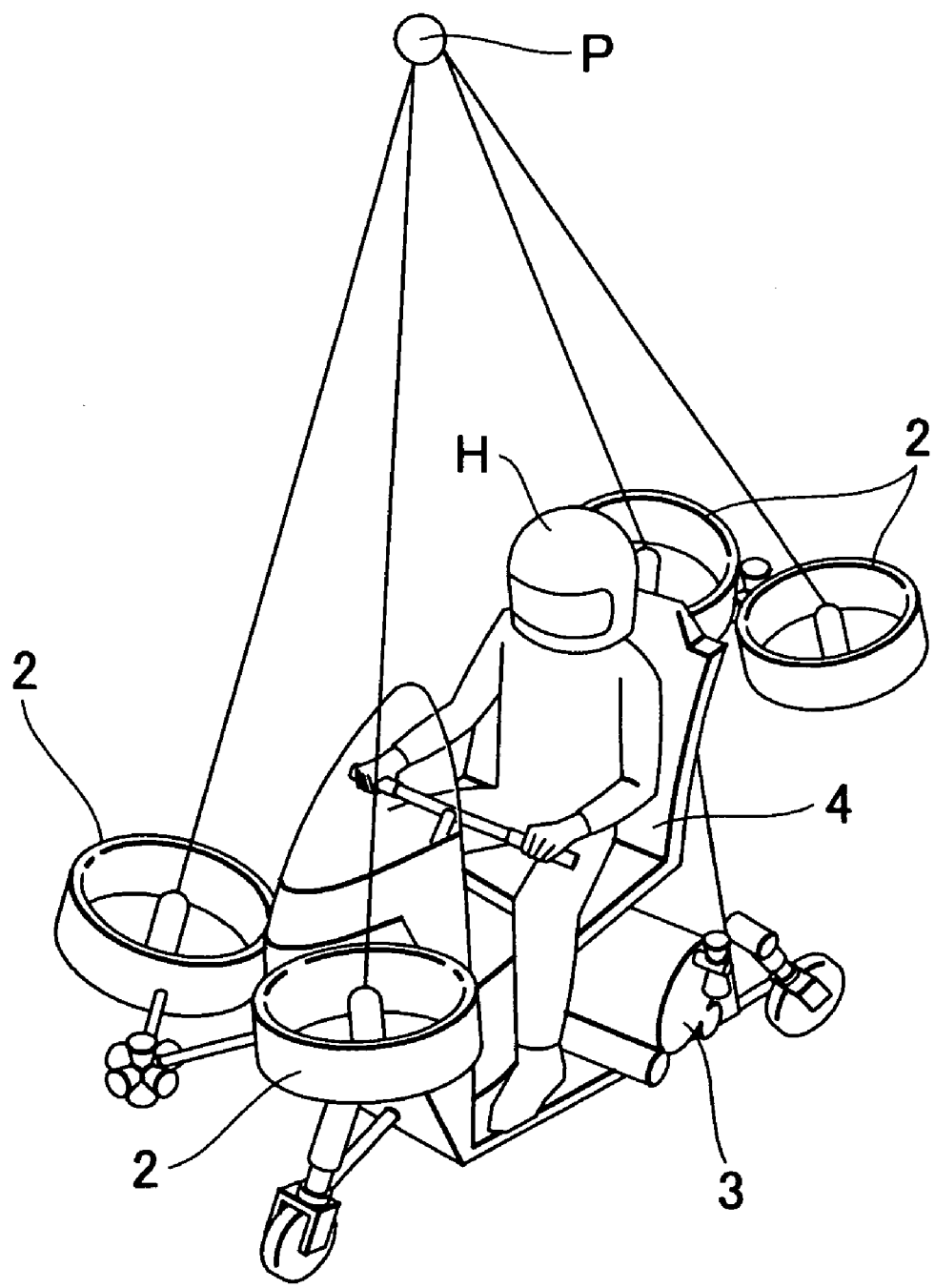
FIG. 9 is a view showing a vertical take-off and landing aircraft according to a second exemplary embodiment.

Further, in this exemplary embodiment, air jet nozzles are only provided at the front and rear of the aircraft, but air jet nozzles may also be provided on the left and right sides of the aircraft, as shown in FIGS. 7 and 9. Moreover, air jet nozzles aimed to the front and rear and left and right may be added in addition to those aimed up and down.

A seventh exemplary embodiment is shown in FIGS. 25A, 25B, and 25C to 28. In this exemplary embodiment, spokes of the wheels are shaped like rotors. The other structure is similar to that of the foregoing exemplary embodiment, so the following description will focus mainly on the part that differs.

Figure 25A:
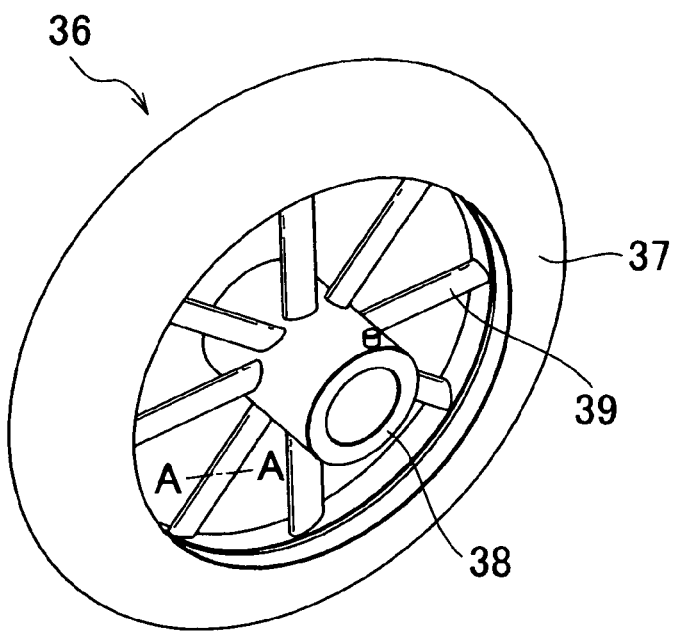
FIGS. 25A, 25B, and 25C are views showing the structure of a rotor wheel according to a seventh exemplary embodiment of the invention.
Figure 25B:
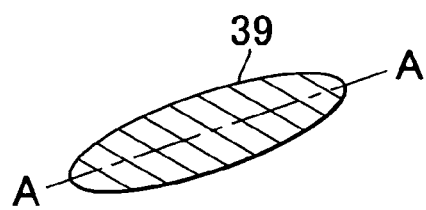
Figure 25C:
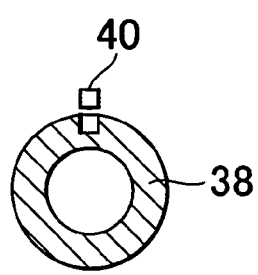

FIG. 25A is a perspective view of a rotor wheel 36 of the aircraft according to this exemplary embodiment. The rotor wheel 36 is provided at both the front and rear sections of the aircraft. Spokes 39 which connect an outer peripheral portion (tire) 37 of the rotor wheel 36 to a hub portion 38 are shaped like rotors (propellers). More specifically, the spokes 39 have an elliptic wing-shaped cross-section as shown in FIG. 25B, and are attached at an angle such that the direction of the long axis (A-A direction) is at a predetermined angle with respect to the rotating surface of the rotor wheel 36. Also, a rotation speed pickup 40 is housed in the hub portion 38, as shown in FIG. 25C.

Figure 26:
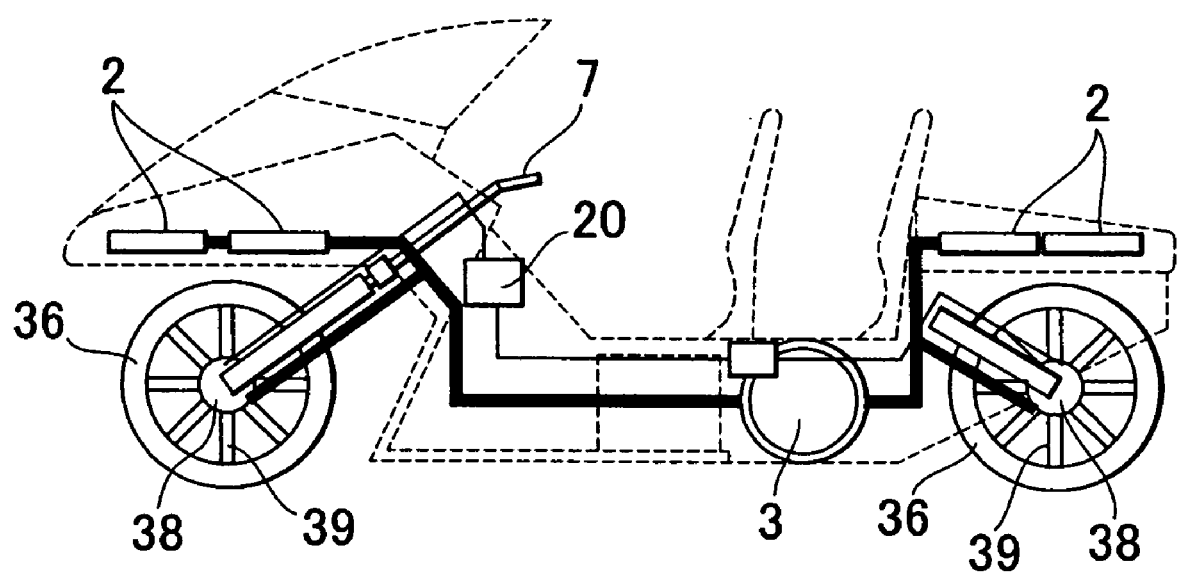
FIG. 26 is a view of a vertical take-off and landing aircraft according to the seventh exemplary embodiment of the invention.

FIG. 26 is a transparent side view of the aircraft. The rotor wheel 36 is rotated by the prime mover (of a high-pressure gas type or motor shaft output type, for example) 3 of the fans 2. The attitude control computer 20 is connected to the rotation speed pickup 40 and the prime mover 3, and controls both the direction and speed of rotation of the rotor wheel 36 by controlling the output of the prime mover 3 appropriately.

When the rotor wheel 36 is rotated during flight, a gyro moment is generated therein. As a result, by changing the direction in which the rotor wheel 36 is pointed using the yoke 7, it is possible to change the attitude in the yaw direction, just as in the third exemplary embodiment. Also, because the spokes 39 of the rotor wheel 36 are shaped like rotors, aerodynamic force (lift) is generated in the direction of the rotational axis of the rotor wheel 36 when it is rotated. The gyro moment and the aerodynamic force become greater the faster the rotor wheel 36 spins, and smaller the slower the rotor wheel 36 spins. Moreover, when the rotor wheel 36 is rotated in the reverse direction, aerodynamic force in the reverse direction is generated. In this exemplary embodiment, the spokes 39 are elliptic wings with left-right symmetry. As a result, approximately the same amount of aerodynamic force is generated when the rotor wheel 36 spins in the normal direction as when it spins in the reverse direction.

Figure 27:
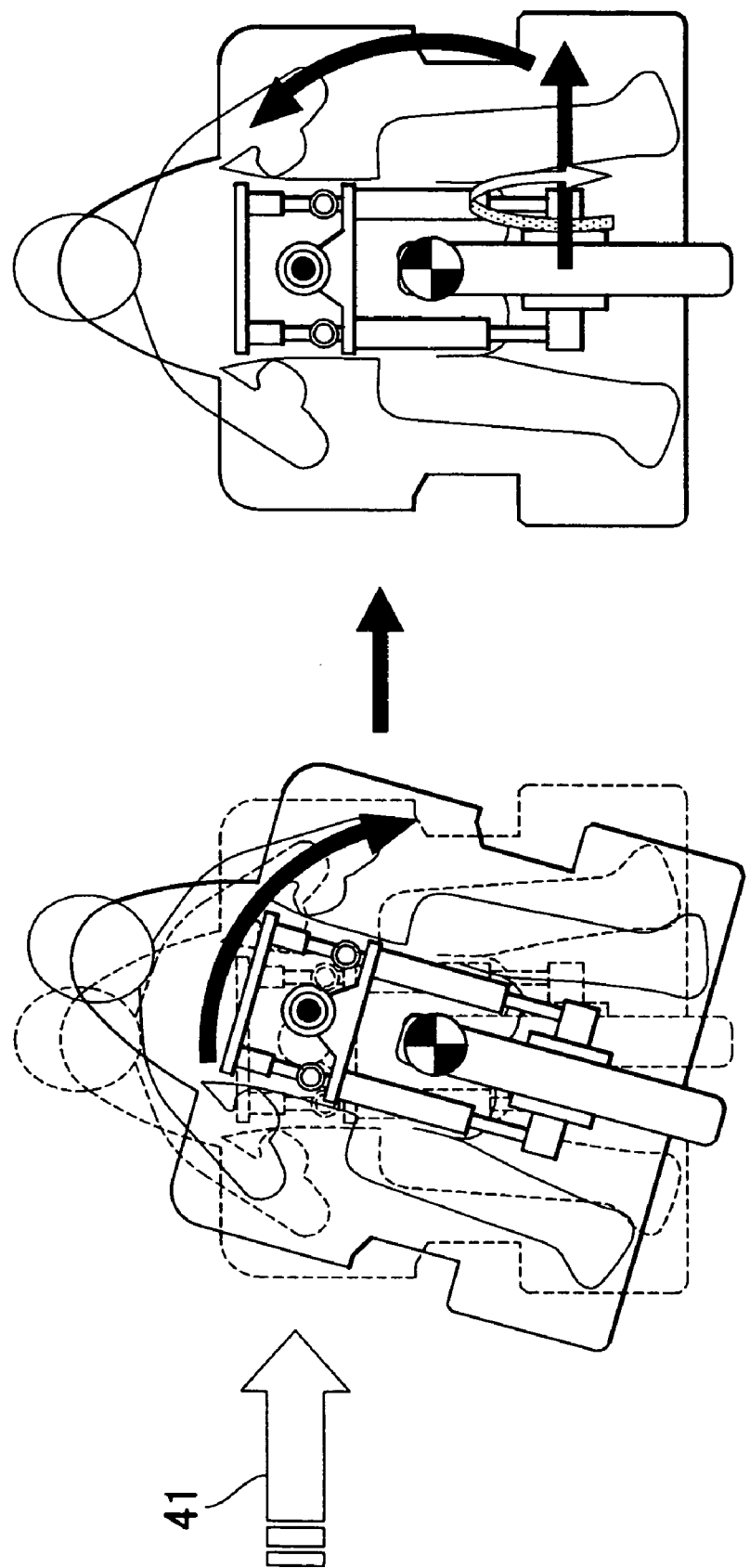
FIG. 27 is a view showing the aircraft when attitude control in the roll direction is performed by rotating the rotor wheel in the normal direction.
Figure 28:
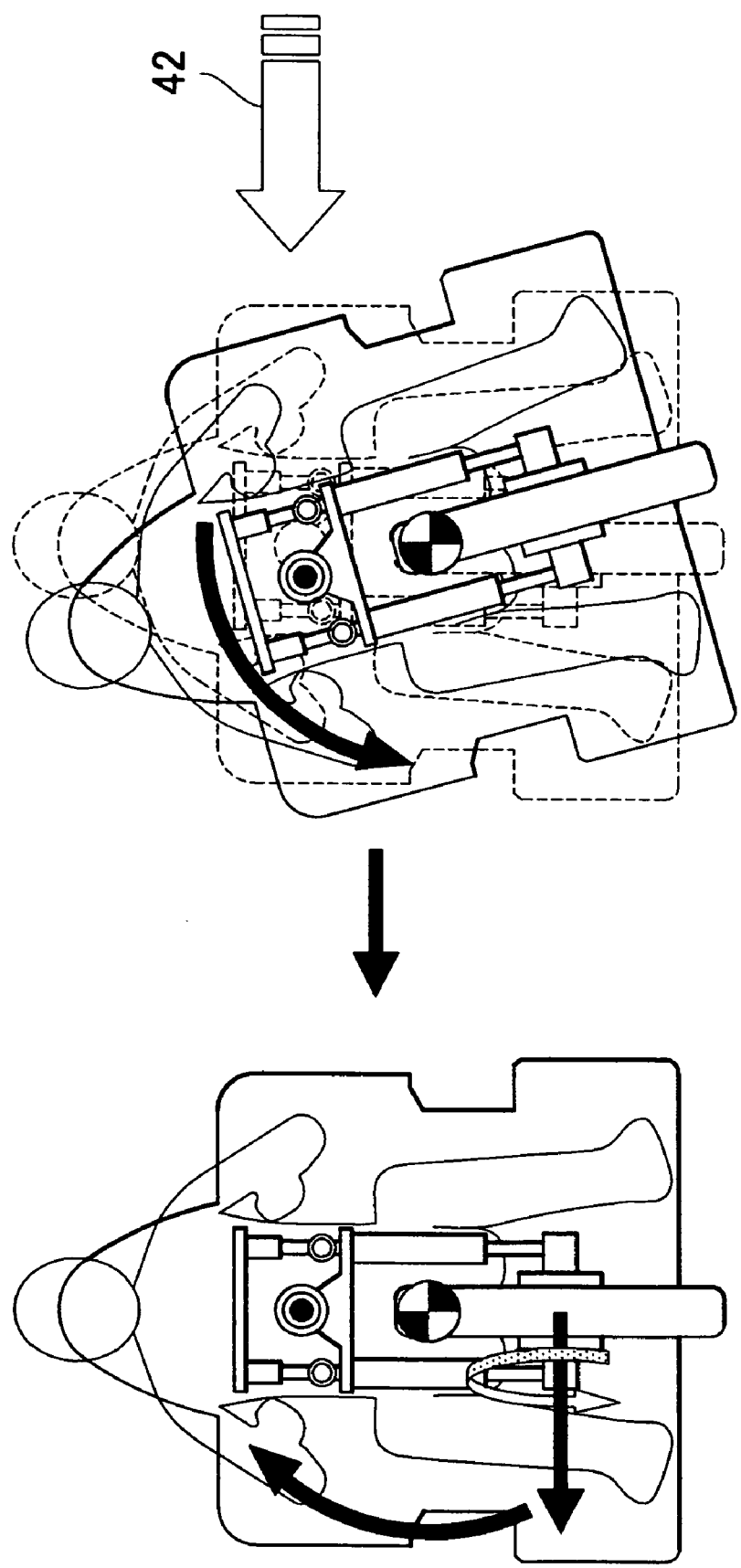
FIG. 28 is a view showing the aircraft when attitude control in the roll direction is performed by rotating the rotor wheel in the reverse direction.

If the aircraft rolls to the left due to a wind disturbance 41, a restoration roll moment can be generated using this kind of aerodynamic force to return the aircraft to its original attitude by rotating the front and rear rotor wheels 36 of the aircraft in the normal direction, as shown in FIG. 27. Conversely, if the aircraft rolls to the right due to a wind disturbance 42, a restoration roll moment can be generated to return the aircraft to its original attitude by rotating the front and rear rotor wheels 36 of the aircraft in the reverse direction, as shown in FIG. 28. Further, it is also possible to generate a yaw moment in the aircraft by making the directions of rotation of the front and rear rotor wheel 36 of the aircraft different from each other.

In this exemplary embodiment, just as in the fourth exemplary embodiment, a mechanism that allows the rotor wheel 36 to tilt in the roll direction may be provided and the attitude may be controlled by the gyro moment together with aerodynamic force.

Figure 29:
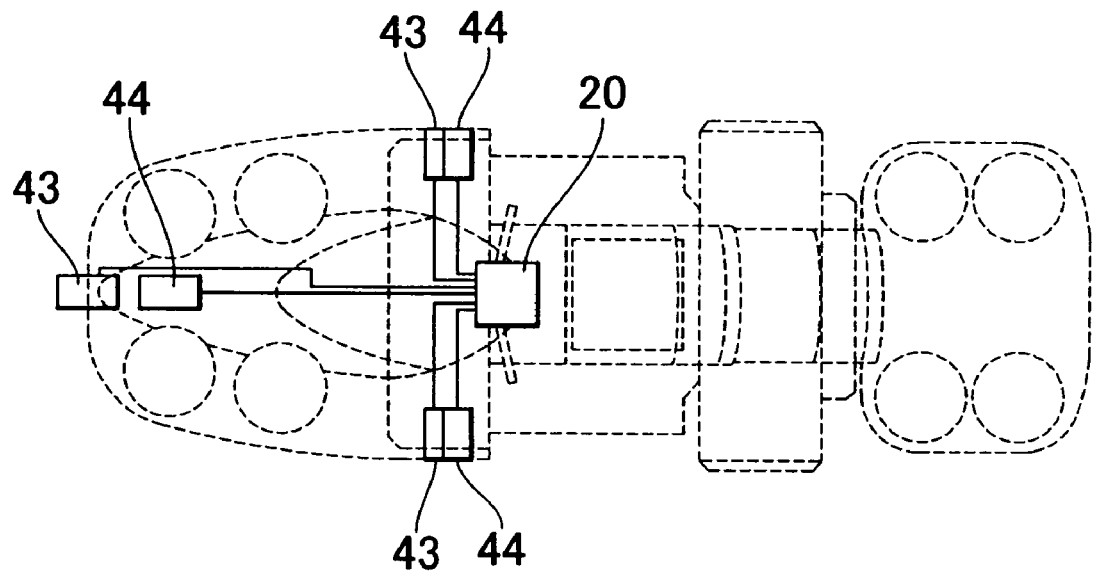
FIG. 29 is a view of a vertical take-off and landing aircraft according to an eighth exemplary embodiment of the invention.
Figure 30:
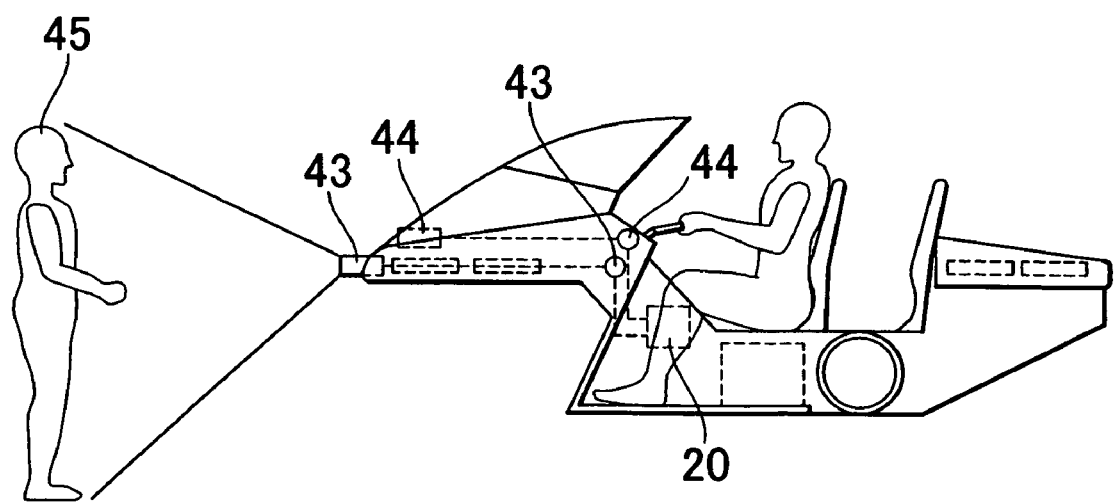
FIG. 30 is a view showing a person being imaged.
Figure 31:
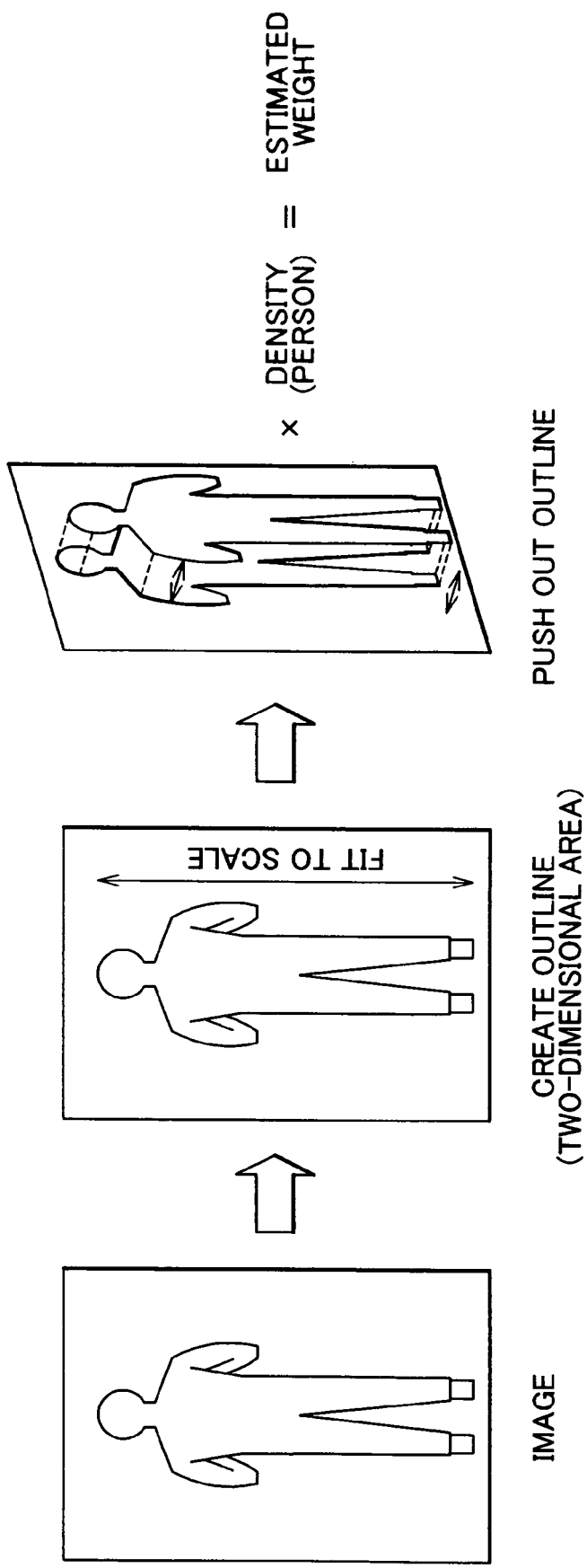
FIG. 31 is a view showing the flow of a weight estimating routine.

An eighth exemplary embodiment of the invention is shown in FIGS. 29 to 31. The aircraft according to this exemplary embodiment is provided with means for estimating the weight of a person. The rest of the structure is similar to that of the foregoing exemplary embodiment, so the following description will focus mainly on the part that differs.

A CCD camera 43, i.e., an imaging device, and a distance measuring device 44, are provided together in three different locations, i.e., the front and both sides, of the aircraft, as shown in FIG. 29. The CCD camera 43 preferably has an infrared camera function. The CCD camera 43 and the distance measuring device 44 are both connected to the attitude control computer 20.

When an image of a person 45 is taken by the CCD camera 43, as shown in FIG. 30, that image is input to the attitude control computer 20. At the same time, the distance measuring device 44 measures the distance to the person 45, and that measured value is also input to the attitude control computer 20.

The attitude control computer 20 first creates an outline of the image and then calculates the two-dimensional area. Next, the attitude control computer 20 calculates the height of the person 45 based on the distance between the CCD camera 43 and the person 45 and fits it to scale. The two-dimensional area is then pushed out in the depth direction to create a virtual three-dimensional model and the volume is then calculated. The amount that the two-dimensional area is pushed out can be determined using, for example, the ratio "height:depth=180:30". The estimated weight of the person 45 is then calculated by multiplying the average density of a person by the volume.

This exemplary embodiment thus enables the weight of the person 45 to be estimated beforehand, which makes it is possible to easily determine whether it is possible to fly with that person onboard.

Moreover, because the CCD camera 43 and the distance measuring device 44 are both provided on the sides of the aircraft, it possible to estimate the person's weight even when close to the person 45 from the side.

A ninth exemplary embodiment of the invention is shown in FIGS. 32A and 32B to 34. The aircraft according to this exemplary embodiment is provided with means for adjusting the thrust in response to an increase in passenger weight. The rest of the structure is similar to that of the foregoing exemplary embodiment, so the following description will focus mainly on the part that differs.

Figure 32A:
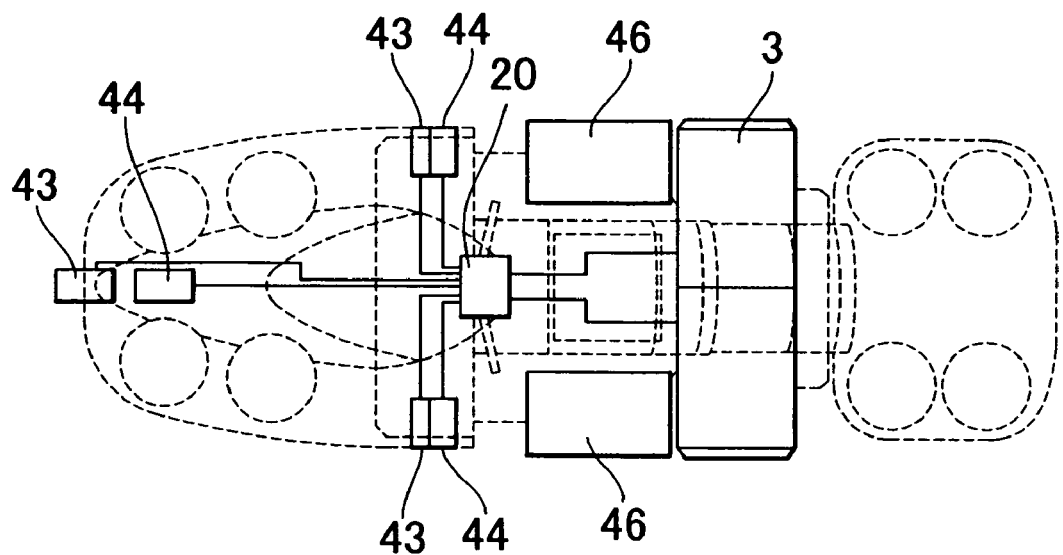
FIGS. 32A and 32B are views of a vertical take-off and landing aircraft according to a ninth exemplary embodiment of the invention.
Figure 32B:
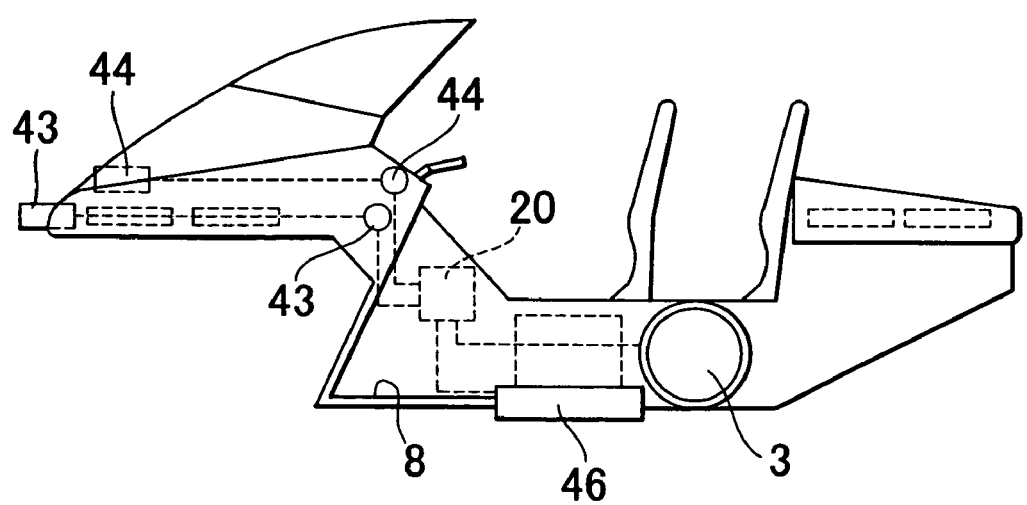

As shown in FIGS. 32A and 32B, the CCD camera 43, i.e., an imaging device, and the distance measuring device 44 are provided together in three different locations, i.e., the front and both sides, of the aircraft. The CCD camera 43 preferably has an infrared camera function. Also, a weight sensor 46 is provided on the left and right steps 8 of the aircraft. The CCD camera 43, the distance measuring device 44, the weight sensor 46, and the prime mover 3 are all connected to the attitude control computer 20.

Figure 34:
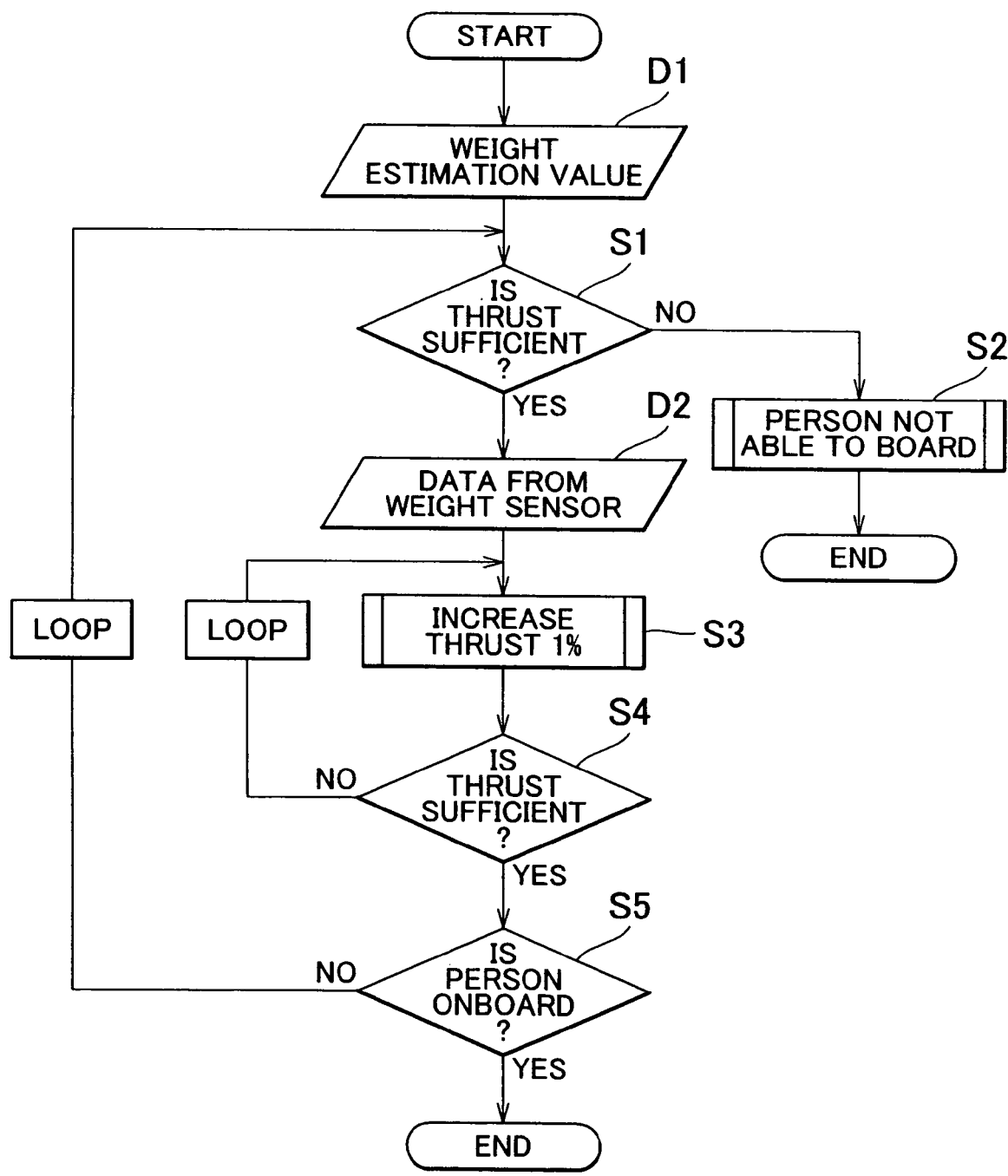
FIG. 34 is a flowchart illustrating the flow of a thrust adjustment routine.

The flow of the thrust adjustment routine will now be described with reference to FIGS. 33 and 34. FIG. 33 is a view showing a person 47 in need of rescue from a burning building, while FIG. 34 is a flowchart of the thrust adjustment routine.

The attitude control computer 20 first estimates the weight of the person 47 in need of rescue, as described in the eighth exemplary embodiment. Then in step S1 it is determined based on a weight estimation value D1 whether there is sufficient thrust to fly stably with the person 47 in need of rescue onboard. If it is determined that the thrust is insufficient, the aircraft is unable to accommodate the person 47 in need of rescue (step S2).

If, on the other hand, it is determined that there is sufficient thrust, the attitude control computer 20 reads weight data D2 from the weight sensor 46. The attitude control computer then executes a feedback loop control to increase the thrust in increments of 1% until there is sufficient thrust for the amount of increase in weight (steps S3 and S4). The black arrow in FIG. 33 indicates the thrust before the weight increase, and the white arrow indicates the thrust after the weight increase.

When the thrust has been increased appropriately, the routine exits the loop and it is determined whether the person 47 in need of rescue is onboard (step S5). Once that person 47 is onboard, the routine ends. Also, if the person 47 is in the process of getting onboard, the process returns to step S1 and new weight data D2 is read. The thrust is then increased according to the new amount of weight increase.

Increasing the thrust appropriately in response to a change in the weight of the person 47 in need of rescue on the aircraft from the time that that person 47 steps onboard until he or she is seated in the occupant seat by repeating the loop routine enables the person 47 in need of rescue to safely board the aircraft while it is hovering near a building.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A vertical take-off and landing aircraft, comprising:
    a plurality of thrust generators which generate thrust substantially vertically upward with respect to the aircraft; a first prime mover which drives the thrust generators; and
    an occupant seat,
    wherein at least one of the thrust generators is disposed at either a front section of the aircraft or a rear section of the aircraft, and the remaining thrust generator or thrust generators are disposed at either the rear section or the front section, whichever the at least one of the thrust generators is not disposed at, and the prime mover and a sitting surface of the occupant seat are disposed between the at least one of the thrust generators at the front section of the aircraft and the at least one of the thrust generators at the rear section of the aircraft, and in a position lower than all of the thrust generators, and further wherein a center of gravity of the aircraft is below a center of the aircraft.

2. The vertical take-off and landing aircraft according to claim 1, wherein the thrust generators are provided in plurality at the front section of the aircraft.

3. The vertical take-off and landing aircraft according to claim 1, wherein the thrust generators are provided in plurality at the rear section of the aircraft.

4. The vertical take-off and landing aircraft according to claim 1, wherein the thrust generators are disposed such that the directions of thrust from the thrust generators intersect at a point substantially vertically above the center of gravity of the aircraft.

5. The vertical take-off and landing aircraft according to claim 4, further comprising:
   a wheel that enables the aircraft to run on the ground; and
   a second prime mover that rotates the wheel.

6. The vertical take-off and landing aircraft according to claim 5, further comprising:
   a detector that detects an attitude angle of the aircraft;
   a tilt mechanism which enables the wheel to tilt in a roll direction; and
   a controller which adjusts a tilt angle of the wheel in response to the attitude angle while the vertical take-off and landing aircraft is in flight.

7. The vertical take-off and landing aircraft according to claim 6, wherein the tilt mechanism has a pair of left and right actuators, and the controller adjusts the tilt angle of the wheel in the roll direction by changing the lengths of the actuators.

8. The vertical take-off and landing aircraft according to claim 5, wherein a spoke of the wheel has a propeller shape.

9. The vertical take-off and landing aircraft according to claim 4, further comprising:
   a wheel that enables the aircraft to run on the ground, wherein the first prime mover rotates the wheel.

10. The vertical take-off and landing aircraft according to claim 1, further comprising:
    a wheel that enables the aircraft to run on the ground; and
    a second prime mover that rotates the wheel.

11. The vertical take-off and landing aircraft according to claim 10, further comprising:
    a detector that detects an attitude angle of the aircraft;
    a tilt mechanism which enables the wheel to tilt in a roll direction; and
    a controller which adjusts a tilt angle of the wheel in response to the attitude angle while the vertical take-off and landing aircraft is in flight.

12. The vertical take-off and landing aircraft according to claim 11, wherein the tilt mechanism has a pair of left and right actuators, and the controller adjusts the tilt angle of the wheel in the roll direction by changing the lengths of the actuators.

13. The vertical take-off and landing aircraft according to claim 10, wherein a spoke of the wheel has a propeller shape.

14. The vertical take-off and landing aircraft according to claim 1, further comprising:
    a wheel that enables the aircraft to run on the ground, wherein the first prime mover rotates the wheel.

15. The vertical take-off and landing aircraft according to claim 1, further comprising:
    a protective member that covers at least a head of an occupant; and
    a parachute housed inside the protective member,
    wherein the parachute is fixed to the aircraft substantially vertically above the center of gravity of the aircraft.

16. The vertical take-off and landing aircraft according to claim 1, further comprising:
    a jet nozzle which generates auxiliary thrust.

* * * * *